(12) United States Patent
Cohen et al.

(10) Patent No.: US 9,779,078 B2
(45) Date of Patent: Oct. 3, 2017

(54) PAYROLL PROCESSOR SYSTEM AND METHOD

(75) Inventors: Neal M. Cohen, Rockaway, NJ (US); Lewis Randolph Watson, IV, Altadena, CA (US); Jonathan Mark Hughes, Cambridgeshire (GB); Matthew Lee Walters, Glapthorn (GB)

(73) Assignee: AUTOMATIC DATA PROCESSING, INC., Roseland, NJ (US)

( * ) Notice: Subject to any disclaimer, the term of this patent is extended or adjusted under 35 U.S.C. 154(b) by 2847 days.

(21) Appl. No.: 10/982,550

(22) Filed: Nov. 5, 2004

(65) Prior Publication Data

US 2006/0111990 A1   May 25, 2006

(51) Int. Cl.
  *G06F 17/24* (2006.01)
  *G06Q 40/00* (2012.01)
  *G06F 17/21* (2006.01)

(52) U.S. Cl.
  CPC .......... *G06F 17/248* (2013.01); *G06F 17/211* (2013.01); *G06Q 40/125* (2013.12)

(58) Field of Classification Search
  CPC .... G06F 17/248; G06F 17/211; G06Q 40/125
  See application file for complete search history.

(56) References Cited

U.S. PATENT DOCUMENTS 5,326,104 A   7/1994 Pease et al.
5,367,619 A   11/1994 Dipaolo et al.
6,102,966 A * 8/2000 Tyma ............................ 717/110
6,183,140 B1  2/2001 Singer et al.
6,347,306 B1  2/2002 Swart
(Continued)

FOREIGN PATENT DOCUMENTS

AU   0022394 A5   9/2001
WO   WO 01/24090   4/2001
WO   WO 01/82202   11/2001

OTHER PUBLICATIONS

Hightower, Lauren. "Examining the FDF toolkit: Making PDF files come alive" Dr. Dobb's Journal; Aug. 2001; 26, 8. pp. 87, 89, 90, 92, 94, 95.*

(Continued)

*Primary Examiner* — H Rojas
(74) *Attorney, Agent, or Firm* — Schmeiser, Olsen & Watts, LLP

(57) ABSTRACT

A system and method for payroll processing. In one embodiment, the system includes a first database, a second database, and a processor operably connected to the first and second databases. The first database contains information about an employer, and the second database contains a PDF template. The processor is operable to create a filable PDF tax form from the PDF template, with the filable PDF tax form including data retrieved from and/or calculated from the first database. The method of the present invention involves the steps of retrieving with the processor a PDF template from the second database and at least one data from the first database, and then producing a filable PDF tax form from the retrieved PDF template and from the retrieved and/or calculate data from the first database. The present invention provides an employer with control over the generation, validation, correction, completion, and even filing of the employer's tax forms, and creates forms viewable and printable by a variety of systems.

37 Claims, 38 Drawing Sheets

(56) References Cited

U.S. PATENT DOCUMENTS

| | | | |
|---|---|---|---|
| 6,401,079 | B1 | 6/2002 | Kahn et al. |
| 6,411,938 | B1 | 6/2002 | Gates et al. |
| 6,764,013 | B2 | 7/2004 | Ben-Aissa |
| 7,603,301 | B1 * | 10/2009 | Regan .............................. 705/31 |
| 2002/0055894 | A1 | 5/2002 | Hyder |
| 2002/0194221 | A1 | 12/2002 | Strong et al. |
| 2003/0110443 | A1 * | 6/2003 | Yankovich et al. ....... 715/501.1 |
| 2003/0187756 | A1 | 10/2003 | Klivington et al. |
| 2003/0188260 | A1 | 10/2003 | Jensen et al. |
| 2003/0233297 | A1 | 12/2003 | Campbell |
| 2004/0078271 | A1 | 4/2004 | Morano et al. |
| 2004/0083426 | A1 | 4/2004 | Sahu |
| 2005/0060234 | A1 * | 3/2005 | Reahard .......................... 705/19 |

OTHER PUBLICATIONS

Ted Padova, "Creating Adobe Acrobat Forms" 2002. Chapter 5. pp. 1-41.*

"Calculations and Scripts", Adobe Designer Version 6.0, Adobe® Designer Documentation for Microsoft® Windows®, Adobe Systems Incorporated, May 2004. pp. 1-208.*

"Converting Acrobat® JavaScript for Use in LiveCycle™ Designer Forms" Adobe® Acrobat® Adobe LiveCycle™ Designer Version 7.0, Adobe Systems Incorporated, Adobe® Acrobat® Adobe LiveCycle™ 7.0 Designer Converting Acrobat JavaScript for Use in LiveCycle Designer Forms for Microsoft® Windows®, UNIX®, and Linux®, Edition 1.0, Jun. 2005. pp. 1-43.*

"JavaScript 'This' Keyword", pp. 1-6 of 9 pages, retrieved on Feb. 28, 2017 from the Internet: <URL: http://www.devign.me/javascript-this-keyword/>.

"Understand JavaScript's "this" With Clarity, and Master It", pp. 1-9 of 35 pages, retrieved on Feb. 28, 2017 from the Internet: <URL: http://javascriptissexy.com/understand-javascripts-this-with-clarity-and-master-it>.

Canada Notice of Allowance (Nov. 15, 2016), Application No. 2,488,477, 1 page.

Canada Office Action Response (Jul. 23, 2015), Application No. 2,488,477, 31 pages.

* cited by examiner

FIG. 2

PAYROLL PROCESSING
FILE | HELP

| PAYROLL | PAYROLL REPORTS | TAXES | EMPLOYEES | COMPANY | SUPPORT |

FILE TAXES
SET-UP COMPANY TAX

TAX FORMS
SELECT THE TAX FILING YEAR AND QUARTER. CLICK ON THE TAX FORM NAME TO VIEW THE FORM.

TAX PERIOD    YEAR: [2004 ▼]    QUARTER: [THIRD ▼]

FEDERAL
941 EMPLOYER'S QUARTERLY FEDERAL TAX RETURN           941 INSTRUCTIONS
940 EMPLOYER'S ANNUAL FEDERAL UNEMPLOYMENT (FUTA) TAX RETURN    940 INSTRUCTIONS
940-EZ EMPLOYER'S ANNUAL FEDERAL UNEMPLOYMENT (FUTA) TAX RETURN    940-EZ INSTRUCTIONS

STATE
NEW JERSEY
NJ-927 EMPLOYER'S QUARTERLY REPORT
NJ-927W EMPLOYER'S QUARTERLY REPORT (WEEKLY DEPOSITOR)
WR-30 EMPLOYER REPORT OF WAGES PAID                  WR-30 INSTRUCTIONS

PENNSYLVANIA
UC-2 EMPLOYER'S REPORT FOR UNEMPLOYMENT COMPENSATION
UC-2A EMPLOYER'S QUARTERLY REPORT OF WAGES PAID TO EACH EMPLOYEE/SUPPLEMENT
W3R EMPLOYER QUARTERLY RETURN OF WITHHOLDING TAX

HELP
CLOSE
SIGN OUT

FEDERAL 940: EMPLOYER'S ANNUAL FEDERAL UNEMPLOYMENT (FUTA) TAX RETURN
- IRS Form Revision Date: 2003

FORM HEADER

| Field Ref | Field Text | Field Data Type | Field format/ mask | Max Field Length | Separate Dollar & Cent Fields | Special Naming Conventions | Mapping Details | Field Calc Logic |
|---|---|---|---|---|---|---|---|---|
| Name | Name (as distinguished from trade name) | Text | Text | 40 | NA | NA | Populate from Extract ADP_CODE_SETUP.Legal_name | NA |
| Year | Calendar Year | Numeric | YYYY | | NA | NA | Populate from Extract Current year (year in process) in YYYY format | NA |
| Trade Name | Trade name, if any | Text | Text | 45 | NA | NA | Populate from Extract ADP_CODE_SETUP.DBA_name | NA |
| FEIN | Employer identification number (EIN) | Text | ######### | 10 (to include dashes) | NA | NA | Populate from Extract ADP CODE JURISDICTION.EIN where Juris_code = 'USA' and Tax_type_code = "FIT" | NA |
| Street Address1 | Address (number and street) | Text | Text | 30 | NA | NA | Populate from Extract ADP_CODE_SETUP.Legal_address1 | NA |
| Street Address2 | Address (number and street) | Text | Text | 30 | NA | NA | Populate from Extract ADP_CODE_SETUP.Legal_address2 if present | NA |
| City | City | Text | Text | 30 | NA | NA | Populate from Extract ADP_CODE_SETUP.Legal_city | NA |
| State | State | Text | Text | 2 | NA | NA | Populate from Extract ADP_CODE_SETUP.Stateprov_code | NA |
| ZIP | And ZIP code | Text | Text | 10 | NA | NA | Populate from Extract ADP_CODE_SETUP.Legal_zip_post_code | NA |

FIG. 11

FORM – MAIN SECTION

| Field Ref | Field Text | Field Data Type | Field format/mask | Max Field Length | Separate Dollar & Cent Fields | Special Naming Conventions | Mapping Details | Field Calc Logic |
|---|---|---|---|---|---|---|---|---|
| A1 | Are you required to pay unemployment contributions to only one state? (If "No", skip questions B and C) *Yes Check Box* | Check Box | Tic Mark | | NA | NA | Client Input | NA |
| A2 | *No Check Box* | Check Box | Tic Mark | | NA | NA | Client Input | NA |
| B1 | Did you pay all state unemployment contributions by February 2, 2004? ((1) If you deposited your total FUTA tax when due, check "Yes" if you paid all state unemployment contributions by February 10, 2004. (2) If a 0% experience rate is granted, check "Yes". (3) If "No", skip question C.) *Yes check box* | Check Box | Tic Mark | | NA | NA | Client Input | NA |
| B2 | *No check box* | Check Box | Tic Mark | | NA | NA | Client Input | NA |
| C1 | Were all wages that were taxable for FUTA tax also taxable for your state's unemployment tax? *Yes check box* | Check Box | Tic Mark | | NA | NA | Client Input | NA |
| C2 | *No check box* | Check Box | Tic Mark | | NA | NA | Client Input | NA |

FIG. 12A

| Field Ref | Field Text | Field Data Type | Field format/mask | Max Field Length | Separate Dollar & Cent Fields | Special Naming Conventions | Mapping Details | Field Calc Logic |
|---|---|---|---|---|---|---|---|---|
| NA | If you answered "No" to any of these questions, you must file Form 940. If you answered "Yes" to all the questions, you may file Form 940-EZ, which is a simplified version of Form 940. (Successor employers, see Special credit for successor employers on page 3 of the separate instructions.) You can get Form 940-EZ by calling 1-800-TAX-FORM (1-800-829-3676) or from the IRS website at www.irs.gov. | NA | NA | NA | NA | NA | NA | NA |
| Check Box1 | If you will not have to file returns in the future, check here (See Who Must File in the separate instructions) and complete and sign the form | Check Box | Tic Mark | | NA | NA | Client input | NA |
| Check Box2 | If this is an amended return, check here (see Amended Returns in the separate instructions) | Check Box | Tic Mark | | NA | NA | Client input | NA |

FIG. 12B

PART I – Computation of Taxable Wages

| Field Ref | Field Text | Field Data Type | Field format/mask | Max Field Length | Separate Dollar & Cent Fields | Special Naming Conventions | Mapping Details | Field Calc Logic |
|---|---|---|---|---|---|---|---|---|
| I-1 | Total payments (including payments shown on lines 2 and 3) during the calendar year for services of employees | Numeric | ###,###,###.## | | NA | NA | Populate from Extract<br>FUTA subject wage, plus all pre-tax deductions added back for FUTA in the year, plus any exempt payments for all employees in the FEIN. Note the amount from the tax accumulator will include all TPSP if any is present.<br><br>For the year in process sum (EE TAX ACCUM.QxTD_wages_subject_to where Tax_type_code = FUTA and Juris_code = USA) *plus* (EE_DED_TAXAB_ACCUM where Tax_type_code = FUTA and Juris_code = USA and Ded_taxab_type_code = P) *Plus* Item I-2b exempt items (see definition below). | NA |
| I-2a | Exempt Payments (Explain all exempt payments, attaching additional sheets is necessary)[_____<br>__] | Text | Text | As the form allows | NA | NA | Client Input<br>If either GTL or MVNTX earnings are retrieved they should be identified on the dashed lines included with line 2. GTL should be identified as "Group Term Life" and MVNTX should be identified as "Qualified Moving Expenses". | NA |
| | *Explanation text* | | | | | | | |

FIG. 13A

| Field Ref | Field Text | Field Data Type | Field format/mask | Max Field Length | Separate Dollar & Cent Fields | Special Naming Conventions | Mapping Details | Field Calc Logic |
|---|---|---|---|---|---|---|---|---|
| I-2b | Exempt Payments (Explain all exempt payments, attaching additional sheets is necessary)[_ _ _ _] *Actual monetary value* | Numeric | ###,###,###.## | | NA | NA | Populate from Extract Sum EE_EARN_TAXAB_ACCUM.QxTD_Wages_Subj_To where Tax_type_code = FUTA and Juris_code = USA and Earn_Taxab_Code in {GTL, MVNTX} | NA |
| I-3 | Payments of more than $7,000 for services. Enter only amounts over the first $7,000 paid to each employee (see separate instructions). Do not include any exempt payments from line 2. The $7,000 amount is the Federal wage base. Your state wage base may be different. Do not use your state wage limitation. | Numeric | ###,###,###.## | | NA | NA | Populate from Extract Wages over the limit - Total wage in excess of $7,000. Total wages are defined as the subject wage plus pre-tax deductions. (The same as line 1 but minus the Exempt payments). Taxable wages are subtracted from Total wages.<br><br>For the year in process (Sum of EE TAX ACCUM.QxTD_wages_subject_to where Tax_type_code = FUTA and Juris_code = USA *plus* EE DED TAXAB ACCUM where Tax_type_code = FUTA and Juris_code = USA and Ded_taxab_type_code = P) *less* (Sum of EE_TAX_ACCUM.Taxable_Wage where Tax_type_code = FUTA and Juris_code = USA) | NA |
| I-4 | Add lines 2 and 3 | Numeric | ###,###,###.## | | NA | NA | In-form Calculation Add wages over the limit and exempt wages, if any. | {Item I-2b + Item I-3} |
| I-5 | Total Taxable wages (subtract line 4 from line 1) | Numeric | ###,###,###.## | | NA | NA | In-form Calculation (FUTA subject wage plus pre-tax deductions plus exempt wages) *less* wages over the limit and exempt wages | {Item I-1 minus Item I-4} |

FIG. 13B

FORM 940-V – Payment Voucher

| Field Ref | Field Text | Field Data Type | Field format/mask | Max Field Length | Separate Dollar & Cent Fields | Special Naming Conventions | Mapping Details | Field Calc Logic |
|---|---|---|---|---|---|---|---|---|
| V1a | Enter your Employer identification number | Text | ## | 2 (do not include dashes) | NA | NA | Populate from Extract ADP_CODE_JURISDICTION.EIN where Juris_code = "USA" and Tax_type_code = "FUTA" Note: Display first 2 digits only | NA |
| V1b | Enter your Employer identification number | Text | ####### | 7 (do not include dashes) | NA | NA | Populate from Extract ADP_CODE_JURISDICTION.EIN where Juris_code = "USA" and Tax_type_code = "FUTA" Note: Display last 7 digits | NA |
| V2 | Enter the amount of your payment | Numeric | ##,###,###.## | | NA | NA | Client Input | NA |
| V3a | Enter your business name (individual name or sole proprietors) | Text | Text | As the form allows | NA | NA | Client Input | NA |
| V3b | Enter your address | Text | Text | As the form allows | NA | NA | Client Input | NA |
| V3c | Enter your city, state and ZIP code. | Text | Text | As the form allows | NA | NA | Client Input | NA |

FIG. 14

PART II – Tax Due or Refund

| Field Ref | Field Text | Field Data Type | Field format/mask | Max Field Length | Separate Dollar & Cent Fields | Special Naming Conventions | Mapping Details | Field Calc Logic |
|---|---|---|---|---|---|---|---|---|
| II-1 | Gross FUTA tax. (Multiply the wages from Part 1, line 5, by .062) | Numeric | ##,###,###.## | | NA | NA | In-form Calculation<br><br>FUTA Tax withheld Rate is printed on form – Calculate in form using hard coded value | {Item I-5 x .062} |
| II-2 | Maximum credit. (Multiply the wages from Part 1, line 5, by .054) | Numeric | ##,###,###.## | | NA | NA | In-form Calculation<br><br>Maximum Credit against FUTA tax for state contributions. Rate is printed on form – Calculate in form using hard coded value | {Item I-5 x .054} |
| NA | Computation of tentative credit (Note: All taxpayers must complete the applicable columns) | NA | NA | NA | NA | NA | Note: Section II must be completed for each experience rate change per state | NA |
| II-3(a) | (a) Name of State | Text | Text | 2 | NA | NA | Populate from Extract<br>Select Juris_Code from ADP_CODE_JURISDICTION where ADP_CODE_JURISDICTION.TAX_TYPE_CODE = 'SUI-ER'<br>Select rows that were in effective for the year in process | NA |

FIG. 15A

| Field Ref | Field Text | Field Data Type | Field format/ mask | Max Field Length | Separate Dollar & Cent Fields | Special Naming Conventions | Mapping Details | Field Calc Logic |
|---|---|---|---|---|---|---|---|---|
| II-3(b) | (b) State reporting number(s) as shown on employer's state contribution returns | Text | Text | 18 | NA | NA | Populate from Extract If present Select EIN from ADP_CODE_JURISDICTION where Juris_Code = Item II-3(a) and Tax_type_code = SUI-ER. And if present, ADP_CODE_JURISDICTION.EIN _Check_Digit Select the rows that were in effect for the year in process | NA |

FIG. 15B

| II-3(c) | (c) Taxable payroll (as defined in state act) | Numeric | ###,###,###.## | NA | NA | This is the SUI Taxable Wages for the Year in process for the State\SUI ID\Experience Rate being reported. If the SUI ID or Experience Rate changed during the year this would be the SUI Taxable Wages for the period of time that the SUI ID &\or Experience Rate was in effect:<br><br>In-form calculation<br>If the experience rate or SUI ID for the Juris_code has not changed for the year in process;<br>a single row in<br>ADP_CODE_EXPERIENCE_RATE and ADP_CODE_JURISDICTION for Juris_Code = Item II-3(a) and Year in process, then populate with Total Taxable Wages (Item I-5)<br><br>*Else*<br>Populate from Extract<br>Sum of SUI-ER Subject wage where Juris_Code = Item II-3a for all employees in the FEIN for quarter plus any pre-tax deductions:<br><br>(Sum all<br>(EE_TAX_ACCUM.QxTD_wages_subject_to where Juris_code = Item II-3a and Tax_type_code = SUI-ER for all employees in the FEIN in the quarter in process)<br>*Plus*<br>(EE_DED_TAXAB_ACCUM.QxTD_Calcd_amt where Juris_code = Item II-3a and Tax_type_code = SUI-ER and Ded_taxab_type_code = P for all employees in the quarter in process)<br>*less*<br>Wages in excess of taxable wage limit for SUI-ER for all employees in the FEIN for the quarter:<br><br>(Sum all<br>EE_TAX_ACCUM.QxTD_wages_subject_to where Juris_code = Item II-3a and Tax_type_code = SUI-ER for all employees in the FEIN in the quarter in process) *Plus*<br>(EE_DED_TAXAB_ACCUM.QxTD_Calcd_amt where Juris_code = Item II-3a and Tax_type_code = SUI-ER and Ded_taxab_type_code = P for all employees in the quarter in process) | {Item I-1 minus Item I-4} |

*FIG. 15C*

| Field Ref | Field Text | Field Data Type | Field format/ mask | Max Field Length | Separate Dollar & Cent Fields | Special Naming Conventions | Mapping Details | Field Calc Logic |
|---|---|---|---|---|---|---|---|---|
| II-3(d)-1 | (d) State experience rate period From | Date | MM/DD/YYYY | | NA | NA | Client Input<br>These dates will be populated by the extract but will also be left open for client input:<br>Select ADP_CODE_EXPERIENCE_RATE.Exp_Rate_From Where Juris_Code = Item II-3a and Tax_Type_Code = SUI-ER | NA |
| II-3(d)-2 | (d) State experience rate period To | Date | MM/DD/YYYY | | NA | NA | Client Input<br>These dates will be populated by the extract but will also be left open for client input:<br>Select ADP_CODE_EXPERIENCE_RATE.Exp_Rate_To Where Juris_Code = Item II-3a and Tax_Type_Code = SUI-ER | NA |
| II-3e | (e) State experience rate | Numeric | ##.### # | | NA | NA | Client input<br>This rate will be pre-populated from the extract program using the experience rate. Leave field open for client input – any changes here will affect Tax Due:<br>Select ADP_CODE_EXPERIENCE_RATE.Experience_Rate where Juris_code = Item II-3a and Tax_type_code = "SUI-ER". | NA |

FIG. 15D

| Field Ref | Field Text | Field Data Type | Field format/ mask | Max Field Length | Separate Dollar & Cent Fields | Special Naming Conventions | Mapping Details | Field Calc Logic |
|---|---|---|---|---|---|---|---|---|
| II-3(f) | (f) Contributions if rate had been 5.4% (Col. (c) x .054) | Numeric | ##,### ,###.# # | | NA | NA | In-form Calculation<br><br>Rate is printed on form – Calculate in form using hard coded value | {Item II-3(c) x 0.054} |
| II-3(g) | (g) Contributions payable at experience rate (Col. (c) x Col. (e)) | Numeric | ##,### ,###.# # | | NA | NA | In-form Calculation | {Item II-3(c) x Item II-3(e)} |
| II-3(h) | (h) Additional credit (Col. (f) minus Col. (g)) If 0 or less, enter –0–. | Numeric | ##,### ,###.# # | | NA | NA | In-form Calculation<br><br>Note: If zero or less, enter 0 | {Item II-3(f) minus Item II-3(g)} |
| II-3(i) | (i) Contributions paid to state by 940 due date | Numeric | ##,### ,###.# # | | NA | NA | Client Input<br>This value will be pre-populated with the value in Item II-3(g), however it will be left open for client input | NA |
| II-3a-Totals-h | Totals | Numeric | ##,### ,###.# # | | NA | NA | In-form Calculation | Sum of all Item II-3(h) values |

FIG. 15E

| Field Ref | Field Text | Field Data Type | Field format/ mask | Max Field Length | Separate Dollar & Cent Fields | Special Naming Conventions | Mapping Details | Field Calc Logic |
|---|---|---|---|---|---|---|---|---|
| II-3a-Totals-i | Totals | Numeric | ##,####,####.## | | NA | NA | In-form Calculation | Sum of all Item II-3(i) values |
| II-3b-Credit | Total tentative credit (add line 3a, columns (h) and (i) only – for late payments, also see the instructions for Part II, line 6) | Numeric | ##,####,####.## | | NA | NA | In-form Calculation | Sum Total of Item II-3a-Total-h and Item II-3a-Totals-i |
| II-4 | NA | NA | NA | NA | NA | NA | NA | NA |
| II-5 | NA | NA | NA | NA | NA | NA | NA | NA |
| II-6 | Credit: Enter the smaller of the amount from Part II, line 2 or line 3b; or the amount from the worksheet on page 5 of the separate instructions | Numeric | ##,####,####.## | | NA | NA | In-form Comparison Note: Because this field is not a true in-form calculation, client input is permitted | {if Item II-2 is < Item II-3b-credit then display Item II-2 else display Item II-3b-credit} |

FIG. 15F

| Field Ref | Field Text | Field Data Type | Field format/ mask | Max Field Length | Separate Dollar & Cent Fields | Special Naming Conventions | Mapping Details | Field Calc Logic |
|---|---|---|---|---|---|---|---|---|
| II-7 | Total FUTA tax (subtract line 6 from line 1). If the result is over $100, also complete Part III | Numeric | ##,###.## | | NA | NA | In-form Calculation | {Item II-1 minus Item II-6} |
| II-8 | Total FUTA tax deposited for the year, including any overpayment applied from a prior year | Numeric | ##,###.## | | NA | NA | Client input | NA |
| II-9 | Balance due (subtract line 8 from line 7). Pay to the "United States Treasury". If you owe more than $100, see Depositing FUTS tax on page 3 of the separate instructions | Numeric | ##,###.## | | NA | NA | In-form Calculation | {Item II-7 minus Item II-8} |
| II-10a | Overpayment (subtract line 7 from line 8). Check if it is to be applied to next return or Refunded | Numeric | ##,###.## | | NA | NA | In-form Calculation | {Item II-8 minus Item II-7} |
| II-10b | Overpayment (subtract line 7 from line 8). Check if it is to be applied to next return or Refunded *Applied to next return check box* | Check Box | Tic Mark | | NA | NA | Client input | NA |
| II-10c | Overpayment (subtract line 7 from line 8). Check if it is to be applied to next return or Refunded *Refunded check box* | Check Box | Tic Mark | | NA | NA | Client input | NA |

FIG. 15G

PART III – RECORD OF QUARTERLY FEDERAL UNEMPLOYMENT TAX LIABILITY (Do not include state liability.)
Complete only if Part II, line 7 is over $100

| Field Ref | Field Text | Field Data Type | Field format/mask | Max Field Length | Separate Dollar & Cent Fields | Special Naming Conventions | Mapping Details | Field Calc Logic |
|---|---|---|---|---|---|---|---|---|
| Q1 | Liability for quarter First (Jan 1 – Mar 31) | Numeric | ##,###,###.## | | NA | NA | Populate from Extract FUTA withheld in first quarter of year Sum of EE TAX ACCUM. Q1TD_tax_withheld for all employees in the FEIN in the year in process Note: This field may need to be amended by the client to account for beginning balances. | NA |
| Q2 | Liability for quarter Second (Apr1 – June 30) | Numeric | ##,###,###.## | | NA | NA | Populate from Extract FUTA withheld in second quarter of year Sum of EE TAX ACCUM. Q2TD_tax_withheld for all employees in the FEIN in the year in process Note: This field may need to be amended by the client to account for beginning balances | NA |
| Q3 | Liability for quarter Third (July 1 – Sept 30) | Numeric | ##,###,###.## | | NA | NA | Populate from Extract FUTA withheld in third quarter of year Sum of EE TAX ACCUM. Q3TD_tax_withheld for all employees in the FEIN in the year in process Note: This field may need to be amended by the client to account for beginning balances | NA |
| Q4 | Liability for quarter Fourth (Oct 1 – Dec 31) | Numeric | ##,###,###.## | | NA | NA | Populate from Extract FUTA withheld in fourth quarter of year Sum of EE TAX ACCUM. Q4TD_tax_withheld for all employees in the FEIN in the year in process Note: This field may need to be amended by the client to account for beginning balances | NA |

FIG. 16A

| Field Ref | Field Text | Field Data Type | Field format/mask | Max Field Length | Separate Dollar & Cent Fields | Special Naming Conventions | Mapping Details | | Field Calc Logic |
|---|---|---|---|---|---|---|---|---|---|
| | | | | | | | In-form Calculation | | {Qtr1 + Qtr2 + Qtr3 + Qtr4} |
| Tot | Total for Year | Numeric | ##,###,###.## | | NA | NA | Total of four quarters | | |

FIG. 16B

THIRD PARTY DESIGNEE SECTION

| Field Ref | Field Text | Field Data Type | Field format/mask | Max Field Length | Separate Dollar & Cent Fields | Special Naming Conventions | Mapping Details | Field Calc Logic |
|---|---|---|---|---|---|---|---|---|
| Third Party Box1 | Do you want to allow another person to discuss this return with the IRS ☐ Yes | Check Box | Tic Mark | | NA | NA | Client Input | NA |
| Third Party Box2 | ☐ No | Check Box | Tic Mark | | NA | NA | Client Input | NA |
| Third Party Name | Designee's Name | Text | Text | As the form allows | NA | NA | Client Input | NA |
| Third Party Area Code | Phone no. | Text | Text | 3 | NA | NA | Client Input | NA |
| Third Party Phone | Phone no. | Text | ###-#### | | NA | NA | Client Input | NA |
| Third Party PIN | Personal identification number (PIN) | Text | Text | 5 | NA | NA | Client Input | NA |

FIG. 17

FORM FOOTER

| Field Ref | Field Text | Field Data Type | Field format/mask | Max Field Length | Separate Dollar & Cent Fields | Special Naming Conventions | Mapping Details | Field Calc Logic |
|---|---|---|---|---|---|---|---|---|
| Title | Title (Owner etc.) | Text | Text | As the form allows | NA | NA | Client Input | NA |
| Date | Date | Date | MM/DD/YYYY | | NA | NA | Client Input | NA |

FIG. 18

VALIDATION STEPS

| Line on Form | Rule | Error Message | Tier | Pre-load Check | Type |
|---|---|---|---|---|---|
| A | Question A is required. | You must select either Yes or No for Question A. | All | | Error |
| A | Both the Yes and the No check box cannot be checked. | Both the Yes check box and the No check box cannot be checked. | All | | Error |
| B | If the answer to A = No, Question B should be blank. | You answered No to Question A. Question B must not have a response. | All | | Error |
| B | Both the Yes and the No check box cannot be checked. | Both the Yes check box and the No check box cannot be checked. | All | | Error |
| C | If the answer to A = No, Question C should be blank. | You answered No to Question A. Question C must not have a response. | All | | Error |
| C | Both the Yes and the No check box cannot be checked. | Both the Yes check box and the No check box cannot be checked. | All | | Error |
| Amended Return | If the Amended Return check box is checked, client may not e-file. | The Amended Return check box must not be checked in order to e-file. | 2 | | Error |
| 1-1 | Total Payments cannot be negative. | Total Payments must not be less than zero. | 2 | | Error |
| 1-2 | Exempt Payments cannot be negative. | Exempt Payments must not be less than zero. | 2 | | Error |
| 1-3 | Payments Over Limit cannot be negative. | Payments Over Limit must not be less than zero. | 2 | | Error |
| 1-4 | Total Exempt Wages cannot be negative. | Total Exempt Wages must not be less than zero. | 2 | | Error |
| 1-5 | Total Taxable Wages cannot be negative. | Total Taxable Wages must not be less than zero. | 2 | | Error |
| 2-1 | Gross FUTA Tax cannot be negative. | Gross FUTA Tax must not be less than zero. | 2 | | Error |

FIG. 19A

| Line on Form | Rule | Error Message | Tier | Pre-load Check | Type |
|---|---|---|---|---|---|
| 2-2 | Maximum Credit cannot be negative. | Maximum Credit must not be less than zero. | 2 | | Error |
| 2-3 | At lease one Computation of Tentative Credit record is required | Tentative Credit record is missing. Verify that the required data has been entered in the Payroll Application. | 2 | | Error |
| 2-3b | State Reporting Number is required | State Reporting Number is required for [StateCode]. | All | | Error |
| 2-3c | Taxable Payroll cannot be negative. | Taxable Payroll for [StateCode] must not be less than zero. | 2 | | Error |
| 2-3d | Experience Rate Period From Date is required. | Experience Rate Period From Date for [StateCode] is required. | All | | Error |
| 2-3d | Experience Rate Period To Date is required. | Experience Rate Period From Date for [StateCode] is required. | All | | Error |
| 2-3d | Experience Rate Period From Date must be equal to the first day of a quarter ( Jan 1, Apr 1, Jul 1 or Oct1) | The Experience Rate Period From Date for [StateCode] must begin on the first day of the quarter. | 2 | | Error |
| 2-3d | Experience Rate Period To Date must be equal to the last day of a quarter (Mar 31, Jun 30, Sep 30 or Dec 31) | The Experience Rate Period To Date for [StateCode] must end on the last day of the quarter. | 2 | | Error |
| 2-3d | If a single state has multiple rates and not all quarters are represented in the Rate Period fields, issue warning. | The Experience Rate Periods listed for [StateCode] do not complete a full year. | 2 | | Warning |
| 2-3d | If a single state has multiple rates, the Rate Period must be unique for each rate. | Duplicate Experience Rate Periods exist for [StateCode] | 2 | | Error |
| 2-3e | State Experience Rate is required. | State Experience Rate for [StateCode] is required. | All | | Error |

FIG. 19B

| Line on Form | Rule | Error Message | Tier | Pre-load Check | Type |
|---|---|---|---|---|---|
| 2-3f | Contributions at 5.4% cannot be negative. | Contributions at 5.4% must not be less than zero. | 2 | | Error |
| 2-3g | Contributions at Experience Rate cannot be negative. | Contributions at Experience Rate must not be less than zero. | 2 | | Error |
| 2-3h | Additional Credit cannot be negative. | Additional Credit must not be less than zero. | 2 | | Error |
| 2-3i | Contributions paid by 940 due date cannot be negative. | Contributions paid by 940 due date must not be less than zero. | 2 | | Error |
| 2-3i | Contributions paid by 940 due date is required. | Contributions paid by 940 due date is required. | All | | Error |
| 2-3a Totals | Total Additional Credit cannot be negative. | Total Additional Credit must not be less than zero. | 2 | | Error |
| 2-3a Totals | Total Contributions paid by 940 due date must not be negative. | Total Contributions paid by 940 due date must not be less than zero. | 2 | | Error |
| 2-3b Credit | Total Tentative Credit must not be negative. | Total Tentative Credit must not be less than zero. | 2 | | Error |
| 2-6 | Credit cannot be negative. | Credit must not be less than zero. | 2 | | Error |
| 2-6 | Credit is required. | Credit is required. | All | | Error |
| 2-7 | If Line 7 is greater than $100, Line 7 must match Part III Total for the Year. | Line 7 and Total for the Year in Part III must be the same. | All | Yes | Error |
| 2-7 | Total FUTA Tax cannot be negative. | Total FUTA Tax must not be less than zero. | All | | Error |
| 2-8 | Total FUTA Tax Deposited cannot be negative. | Total FUTA Tax Deposited must not be less than zero. | 2 | | Error |
| 2-8 | If Total FUTA Tax Deposited is zero or blank, issue warning | Line 8, Total FUTA Tax, indicates no deposits have been made this year. | All | | Warning |

FIG. 19C

| Line on Form | Rule | Error Message | Tier | Pre-load Check | Type |
|---|---|---|---|---|---|
| 2-9 | If Balance Due is $1.00 or greater, client may not e-file. Client will be allowed to complete and print the form; they must file a hard copy. | Balance Due must be less than $1.00 for e-filing. | 2 | | Error |
| 2-9 | Balance Due must be 0 if Overpayment is greater than 0. | Overpayment is greater than zero. Balance Due must be zero. | 2 | | Error |
| 2-9 | Balance Due cannot be negative. | Balance Due must not be less than zero. | 2 | | Error |
| 2-10 | Overpayment cannot be negative. | Overpayment must not be less than zero. | 2 | | Error |
| 2-10 | Overpayment must be 0 if Balance Due is greater than 0. | Balance Due is greater than zero. Overpayment must be zero. | 2 | | Error |
| 2-10 | Both the Credit Elect check box and the Refund check box cannot be checked. | Both the Applied to next return check box and the Refunded check box cannot be checked. | All | | Error |
| 2-10 | Credit Elect check box must be blank if Balance Due is greater than 0. | Balance Due is greater than 0. Applied to next return check box must not be checked. | 2 | | Error |
| 2-10 | Refund check box must be blank if Balance Due is greater than 0. | Balance Due is greater than 0. Refunded check box must not be checked. | 2 | | Error |
| 2-10 | Credit Elect check box must be blank if Overpayment is less than $1.00. | Overpayment is less than $1.00. Applied to next return check box must not be checked | 2 | | Error |
| 2-10 | Refund check box must be blank if Overpayment is less than $1.00. | Overpayment is less than $1.00. Refunded check box must not be checked. | 2 | | Error |
| 2-10 | If Credit Elect check box is checked, Overpayment must have a value greater than $0.99. | The Applied to next return check box is checked. Overpayment must be $1.00 or greater. | 2 | | Error |
| 2-10 | If Refund check box is checked, Overpayment must have a value greater than $0.99. | Refunded check box is checked. Overpayment must be greater than $0.99. | 2 | | Error |

FIG. 19D

| Line on Form | Rule | Error Message | Tier | Pre-load Check | Type |
|---|---|---|---|---|---|
| P II Q1 Liability | Quarter 1 Liability must be populated if FUTA Tax is greater than $100. | FUTA tax is greater than $100, Quarter 1 Liability must be greater than zero. | 2 | | Error |
| P III Q1 Liability | If FUTA Tax is $100 or less, Quarter 1 Liability must be 0 or blank. | FUTA tax is $100 or less, Quarter 1 Liability must not be greater than zero. | 2 | | Error |
| P III Q1 Liability | Quarter 1 Liability cannot be negative. | Quarter 1 Liability must not be less than zero. | 2 | | Error |
| P III Q2 Liability | Quarter 2 Liability must be populated if FUTA Tax is greater than $100. | FUTA tax is greater than $100, Quarter 2 Liability must be greater than zero. | 2 | | Error |
| P III Q2 Liability | If FUTA Tax is $100 or less, Quarter 2 Liability must be 0 or blank. | FUTA tax is $100 or less, Quarter 2 Liability must not be greater than zero. | 2 | | Error |
| P III Q2 Liability | Quarter 2 Liability cannot be negative. | Quarter 2 Liability must not be less than zero. | 2 | | Error |
| P III Q3 Liability | Quarter 3 Liability must be populated if FUTA Tax is greater than $100. | FUTA tax is greater than $100, Quarter 3 Liability must be greater than zero. | 2 | | Error |
| P III Q3 Liability | If FUTA Tax is $100 or less, Quarter 3 Liability must be 0 or blank. | FUTA tax is $100 or less, Quarter 3 Liability must not be greater than zero. | 2 | | Error |
| P III Q3 Liability | Quarter 3 Liability cannot be negative. | Quarter 3 Liability must not be less than zero. | 2 | | Error |
| P III Q4 Liability | Quarter 4 Liability must be populated if FUTA Tax is greater than $100. | FUTA tax is greater than $100, Quarter 4 Liability must be greater than zero. | 2 | | Error |

FIG. 19E

| Line on Form | Rule | Error Message | Tier | Pre-load Check | Type |
|---|---|---|---|---|---|
| P III Q4 Liability | If FUTA Tax is $100 or less, Quarter 4 Liability must be 0 or blank. | FUTA tax is $100 or less, Quarter 4 Liability must not be greater than zero. | 2 | | Error |
| P III Q4 Liability | Quarter 4 Liability cannot be negative. | Quarter 4 Liability must not be less than zero. | 2 | | Error |
| P III Total Year Liability | Total Year Liability must be populated if FUTA Tax is greater than $100. | FUTA tax is greater than $100, Total Year Liability must be greater than zero. | 2 | | Error |
| P III Total Year Liability | If FUTA Tax is $100 or less, Total Year Liability must be 0 or blank. | FUTA tax is $100 or less, Total Year Liability must not be greater than zero. | 2 | | Error |
| P III Total Year Liability | Total Year Liability cannot be negative. | Total Year Liability must not be less than zero. | 2 | | Error |

FIG. 19F

Error Type Descriptions

| Type | Description | Tier 2 Impact | Tier 1 & 3 Impacts |
|---|---|---|---|
| Error | Indicates data is inaccurate, invalid or missing. | e-filing not permitted. Client may print the form regardless of the state of the data. | No impact. Client may print the form regardless of the state of the data. |
| Warning | Provides an alert that data may be inaccurate or missing. | No impact. e-filing is permitted. Client may print the form regardless of the state of the data. | No impact. Client may print the form regardless of the state of the data. |
| Informational | Provides an informational message pertaining to e-filing or the tax form, or identifies that the client needs to perform some action. | No impact. e-filing is permitted. Client may print the form regardless of the state of the data. | No impact. Client may print the form regardless of the state of the data. |

FIG. 20

Additional Data Requirements for e-file

If Exempt Payments (line 2) has a value, the taxable earnings for each earnings code must be identified on the electronic copy of the return. For the initial product version, there will be 2 possible taxable earnings codes, GTL (Group Term Life) and MVNTX (Moving Expenses). The elements that must be passed to the iOps database are defined as follows:

| Field | Type | Size | How Derived |
|---|---|---|---|
| ExemptCode | N | 2 | Valid Values:<br>8 = GTL<br>15 = MVNTX |
| ExemptWage | N | 9.2 | From the extract process for line 2 |

These values will be evaluated at the time of the extract process. They will not be exposed on the PDF but will be held in memory and passed to the iOps database at the time the client hits the e-file button.

FIG. 21 e-file Reformat Rules

When passing data from the tax form to the iOperations database in preparation for electronic filing, the fields identified in the table below must be reformatted.

| Field | Reformat Rule | Execution |
|---|---|---|
| EIN<br>State Reporting Numbers | Remove dashes, spaces, special characters | Receiving process |
| City | Truncate if greater than 25 characters | Receiving process |
| Check boxes:<br>• Question A<br>• Question B<br>• Question C | If the 'Yes' tag is sent with a value = '1', change to 'Y'.<br>If the 'No' tag is sent with a value = '1', change to NULL.<br>If no tag is sent for these client input fields – set to NULL | Receiving process |
| Final Return Checkbox | If sent with a value of 1 – change to 'Y'<br>If no tag is sent for this client input field – set to NULL | Receiving process |
| Check boxes:<br>• Refunded<br>• Applied to Next Return | If the Refunded tag is sent with a value = '1', set the CreditElectReturnFlag = 'R'<br>If the Applied to Next Return tag is sent with a value = '1', set the CreditElectReturnFlag = 'C'<br>If the neither tag is sent, set the CreditElectReturnFlag = NULL | Receiving process |
| Experience Rate | Must be converted to decimal. Format = #.######<br>If blank or zero – set to 0.000000<br>Example: 1.54% = 0.015400 | Receiving Process |
| Total FUTA Tax Deposited | If no tag is sent for this client input field – set to zero | Receiving Process |
| Rate Period From<br>Rate Period To | Format = YYYY-MM-DD | Receiving Process |
| Exempt Code<br>Exempt Wage | These fields are not included on the paper copy of the form. The sending process will be responsible for deriving the value of these fields and passing it to iOps. Refer to the Additional Data Requirements for e-file section above for the logic on how this field is derived. They will only be derived if Line 2 (Exempt Payments) on the 940 has a value. | Sending Process |

FIG. 22A

| Field | Reformat Rule | Execution |
|---|---|---|
| • Total Payments<br>• Exempt Payments<br>• Payments over limit<br>• Total Exempt Wages<br>• Total Taxable Wages<br>• Gross FUTA Tax<br>• Maximum Credit<br>• Taxable Payroll<br>• Contributions at Rate<br>• Contributions at Experience Rate<br>• Additional Credit<br>• Timely Contributions<br>• Total Additional Credit<br>• Total Timely Contributions<br>• Total Tentative Credit<br>• Credit<br>• Total FUTA Tax<br>• Total Tax Deposited<br>• Balance Due<br>• Overpayment<br>• Quarter 1 Liability<br>• Quarter 2 Liability<br>• Quarter 3 Liability<br>• Quarter 4 Liability<br>• Total Year Liability | Zero fill if blank | Sending process |

Fields not required on the e- file Transmission: Calendar Year, Trade Name, Amended Return checkbox, Payment Voucher information, and Signature information

FIG. 22B

PAYROLL PROCESSOR SYSTEM AND METHOD

FIELD OF THE INVENTION

This invention relates to a system and method for payroll processing, and, more particularly, to a system and method for preparation of forms related thereto.

BACKGROUND OF THE INVENTION

There are numerous instances under which businesses are obligated to provide information, and, perhaps, payment, to tax authorities, such as the United States' Internal Revenue Services ("IRS") and state tax authorities. Knowing which forms are to be filed, when the forms are to be filed, and completing the information for filing are resource intensive tasks. These problems are accentuated for businesses doing business in many tax jurisdictions.

One type of regular obligation for tax reporting relates to a business' payroll. For example, businesses must file annually file with the IRS a Federal Tax Form 940 with Form 940-V, Payment Voucher, for taxes due on wages. Information used to complete the Form 940 and Form 940-V is based on total taxable wages and credits for taxable payroll in the states. In addition, the business is required to file a Federal Tax Form 941 quarterly for taxes due on wages. As another example, in Tennessee, a Tennessee Department of Labor and Workforce Development Report must be filed for each employee having Tennessee income, with such report requiring information about the wages and job skills fees paid for that employee.

In present systems payroll systems, two approaches are generally taken by businesses to complete forms requiring wage-related information. One approach is to manually complete the forms based on reports generated by the payroll processor or the payroll processor system used by the business. In a second approach, the tax forms are automatically generated by a payroll processor systems. These generated forms generally have some similarity to the tax authority's official form, but are produced as a result of custom programming by the vendor of the payroll processor system. The need for the custom programming is driven by the actual system together with the specific print capabilities available to the payroll processor or the business—whichever is the end user as to the creation of tax forms. The use of custom programming makes it difficult to maintain the system due to changes in tax authority requirements and/or changes in printing resources. Also, custom programming requires resources to correct errors or to add additional information to the forms, particularly if that information is separate from the payroll processor system.

Consider, for example, the payroll processor system disclosed in U.S. Pat. No. 6,411,938, Gates et al. In the system of Gates et al., tax forms, such as the Federal Form 941, are printed by the payroll processor and mailed to the employer. At the end of the year, the Federal Tax Form 940 is printed by the payroll processor or are placed on a tape and provided by the payroll processor to the IRS. W-2 forms are printed by the payroll processor and mailed to employees. Also, if information is required by state tax authorities, forms required by such state tax authorities must be manually created from the wage listing data.

The system of Gates et al. has several shortcomings. Certainly, with respect to state wage tax requirements, the need to manually create forms from wage listing data consumes time and human resources. Often, wage data is required by a state tax authority on a more frequent basis than once per year. Thus, the consumption of time and human resources can be very costly for an employer.

With regard to forms created by the payroll processor and printed and mailed to the employer, valuable time is lost in sending the forms to the employer. Because such forms are often accompanied with payment, it is preferred that an employer be able to produce such forms on the last date such forms are to be mailed rather than wait and hope that printouts of the forms reach the employer before such date. Such mailing is also problematic if the forms require input from the business that is not known by the payroll processor or if the forms contain any errors. For example, a tax form may require certain credits that are not known to the payroll processor system, and, hence, the payroll processor. Such credits usually affect calculations made on the form. Thus, the business is required to enter data and also to make calculations manually to complete the form.

Also, the employer does not have control over the completion of its tax forms, because the employer does not have the ability to enter data into the tax form. Further, the employer cannot verify the accuracy of the forms until received, nor can any last minute changes be made in the event of changes in payroll or in credits. Thus, the creation of the form by the payroll processor may be incomplete and/or require that the employer complete the form by hand once delivered to the employer by mail. Such a system also does not allow for last minute updates to the data on the forms. In addition, the printed forms of Gates et al. are under the control of the payroll processor, and likely are programmed for printing on the payroll processor's printers. Because all printing is done by the payroll processor, there is no motivation to make the forms printable on various systems used by the employers who use the system.

Another payroll processor system is disclosed in U.S. Pat. No. 6,401,079, Kahn et al. The system of Kahn et al. is able to produce reports for tax authorities—both federal and state, but appears to create reports that are specific to the system as the system executes stored programs to calculate the taxes. As previously mentioned, a system using custom programming is not desired for it requires skilled resources to deal with any changes in the tax calculations. In addition, the system of Kahn et al. does not appear to give the employer control over creation of its tax forms, or the ability to make last minute changes based on update wage-related information.

It is desired to provide a payroll system and method that more effectively deals with requirements, both forms and payments, to various tax authorities. Such a system should permit the users, i.e., the businesses accessing the system, to be able to control printing of the forms and to print such forms at the user's computer. It is also desired to provide the user with the ability to validate the accuracy of the tax information, to override certain data fields, and to allow the user to enter information required and not known by the payroll processor system. It is further desired for the system and method to print forms interpreted by various types and makes of printers without requiring special or custom programming for such support.

SUMMARY OF THE INVENTION

The system and method of the present invention provides an employer with the ability to process the employer's payroll and to prepare and file tax forms containing data extracted and/or calculated from data accessible to the payroll processing functions. In one embodiment, the system includes a first database, a second database, and a processor operably connected to the first database and the second database. The first database contains at least one data about an employer. Such data about any employer may comprise data identifying the employer or wage-related data, for example. The second database contains information necessary to produce a PDF version of a tax form. Referred to herein as a "PDF template", such information may itself be a PDF template or be tabular data used by the system to produce a PDF template in memory or other storage media.

The processor is capable of extracting data from the first database and placing such extracted data on the filable PDF tax form. The processor is further capable of calculating values from at least one other value of the filable PDF tax form. Also, the processor is capable of filling in information across multiple pages of a single form or from a second form to a first form. In addition, the processor permits the user to enter values onto the filable PDF tax form.

The programs used to populate the PDF forms, including extraction, calculation, and relating fields across pages or forms, are performed by programs associated with or embedded as a part of the PDF templates. In one embodiment, associated programs are written in C++ and executed by the processor. In one embodiment, when embedded as a part of the PDF templates, such programs are executed by the user system.

One embodiment of the method of the present involves the first step of providing the first database, the second database, and the processor. At least one of the data about an employer from the first database is retrieved by the processor. A PDF template is also retrieved by the processor from the second database. The processor then generates a filable PDF tax form from the retrieved data and the retrieved PDF template. Such filable PDF tax form may also include calculations. Further, fields from multiple page forms may be carried over between pages, and data extracted or calculations made across multiple forms or supplements accompanying a form.

The system may comprise one or more processors capable of the functions set forth herein. In one embodiment, the system includes a payroll processor system having a processor and a user system having another processor. In another embodiment, the payroll processor system comprises a single processor accessible to the user. Similarly, the method of the present invention may use one or more such processors to accomplish the steps of the method.

The present invention provides an employer with control over its tax forms. Such control is manifested in the ability to request production of the forms and to write information to the forms. The employer may also select the time at which such forms are created and filed. The use of PDF formatted forms, a widely accepted format, eliminate dependency on the system or printers for production of printed forms. Further, the payroll processor system does not need to be custom programmed for particular types of printers. Also, the employer does not have to wait to receive forms from a third party such as a payroll processor.

The present invention utilizes information required by tax authorities as available in the payroll processor system. For such data, no manual entry is required by the employer. In addition, the system permits for automatic selection of the forms to be produced, and can utilize intelligence, business rules, built into the system for determining the forms required and the information required for such forms. It is also possible to retain multiple versions of various tax forms so that the appropriate version of the tax form can be selected. In addition, forms can be assessed for validity. Such validation may occur upon loading of the form by the employer or upon activation of a validation function by the user. These features assist the employer in knowing that the form is permitted by the tax authority and that the form is accurate and complete as prepared by the employer.

BRIEF DESCRIPTION OF THE DRAWINGS

FIG. 2 shows a screen print of an interactive user screen at which a user may run the payroll for an employer according to one embodiment of the present invention.

FIG. 3 shows a screen print of an interactive user screen at which a user may invoke the creation of tax forms according to one embodiment of the present invention.

FIG. 5 shows a screen print of an interactive user screen presenting the bottom of the tax form of FIG. 4 according to one embodiment of the present invention.

FIG. 6 shows a screen print of an interactive user screen presenting a schedule to the tax form of FIG. 4 and FIG. 5 according to one embodiment of the present invention.

FIG. 9 shows a screen print of an interactive user screen presenting the second page of the tax form of FIG. 8 according to one embodiment of the present invention.

FIG. 11 shows a table of system data for the header section for the Federal Tax Form 940 according to one embodiment of the present invention.

FIGS. 12A and 12B show a table of system data for the main section of Federal Tax Form 940 according to one embodiment of the present invention.

FIGS. 13A and 13B show a table of system data for the computation of wages section of Federal Tax Form 940 according to one embodiment of the present invention.

FIG. 14 shows a table of system data for the payment voucher accompanying Federal Tax Form 940 according to one embodiment of the present invention.

FIGS. 15A, 15B, 15C, 15D, 15E, 15F, and 15G show a table of system data for the Part II, Tax Due or Refund, section of Federal Tax Form 940 according to one embodiment of the present invention.

FIGS. 16A and 16B show a table of system data for the record of quarterly unemployment tax liability section of Federal Tax Form 940 according to one embodiment of the present invention.

FIG. 17 shows a table of system data for the third party designee section of Federal Tax Form 940 according to one embodiment of the present invention.

FIG. 18 shows a table of system data for the footer of Federal Tax Form 940 according to one embodiment of the present invention.

FIGS. 19A, 19B, 19C, 19D, 19E, and 19F show a table of system data for validation of Federal Tax Form 940 according to one embodiment of the present invention.

FIG. 20 shows a table of error type descriptions according to one embodiment of the present invention.

FIG. 21 shows a table of additional system data if the Federal Tax Form 940 is to be filed electronically according to one embodiment of the present invention.

FIGS. 22A and 22B show a table of rules for reformatting data from the Federal Tax Form 940 for electronic filing according to one embodiment of the present invention.

DETAILED DESCRIPTION OF THE PREFERRED EMBODIMENTS

Figure 1:
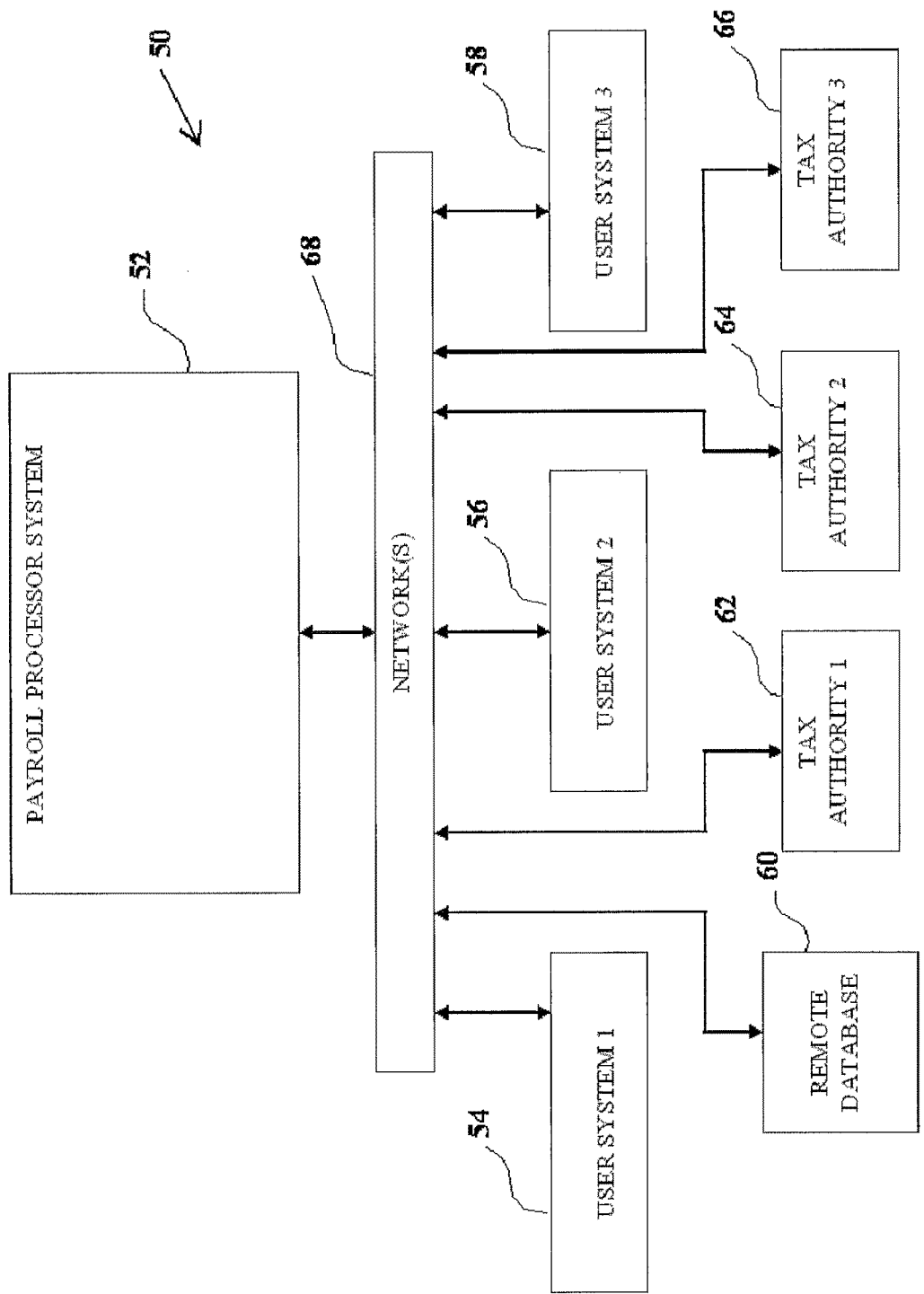
FIG. 1 shows a block diagram of one embodiment of the system according to the present invention.

Referring now to FIG. 1, there is shown a block diagram of one embodiment of the system according to the present invention. In this embodiment, system 50 comprises payroll processor system 52, first user system 54, second user system 56, third user system 58, remote database 60, first tax authority system 62, second tax authority system 64, third tax authority system 66, and network(s) 68. Payroll processor system 52 comprises a processor system as is well known in the art. Payroll processor system 52 may comprise any combination of hardware and/or software. For example, payroll processor system 52 may comprise a server having payroll processor software operating thereon. Payroll processor system 52 is in bidirectional communication with network(s) 68 through which bidirectional communication can be made by payroll processor system 52 with first user system 54, second user system 56, third user system 58, remote database 60, first tax authority system 62, second tax authority system 64, and third tax authority system 66.

In one embodiment, the communication between payroll processor system 52 and first, second, and third tax authority systems 62, 64, and 66 is bidirectional to permit for electronic filing of tax information, and, in another embodiment, payroll processor system 52 is in unidirectional communication with first, second, and third tax authority systems 62, 64, and 66 to allow payroll processor system 52 to send filable PDF tax forms to first, second, and third tax authority systems 62, 64, and 66. In yet another embodiment, first, second, and third user systems 54, 56, and 58 are in bidirectional communication with first, second, and third tax authority systems 62, 64, and 66 to permit for electronic filing of tax information, and, in yet another embodiment, first, second, and third user systems 54, 56, and 58 are in unidirectional communication with first, second, and third tax authority systems 62, 64, and 66 to allow first, second, and third user systems 54, 56, and 58 to send filable PDF tax forms to first, second, and third tax authority systems 62, 64, and 66.

First, second, and third user systems 54, 56, and 58, respectively, each comprise a combination of hardware and/or software capable of interfacing via network(s) 68 to payroll processor system 52. For example, if network(s) 68 comprises the Internet, first, second, and third user systems 54, 56, and 58, respectively, may each comprise servers or personal computers having an Internet browser operating thereon. Such an Internet browser may comprise EXPLORER™ available from Microsoft Corporation or NETSCAPE® available from Netscape Communications Corp. In the embodiment of FIG. 1, each of the user systems 54, 56, and 58 are representative of a "user" of payroll processor system 52. Such a user may comprise an employer who processes its payroll through payroll processor system 52, and or a service provider that processes payroll data for one or more employers through payroll processor system 52. Of course, the number of user systems may vary from the three such systems illustrated in FIG. 1.

In the embodiment of FIG. 1, remote database 60 comprises a system of hardware and/or software capable of bidirectional communication via network(s) 68 with payroll processor system 52. Database 60 may comprise some or all of the data useful to payroll processor system 52, such as data about the tax rates for various tax jurisdictions or the format of the tax forms, for example. Alternatively, database 60 may be operatively connected to payroll processor system 52 by other connections well-known in the art, or may comprise one or more components of payroll processor system 52.

First, second, and third tax authority systems 62, 64, and 66, respectively, each comprise a system or hardware and/or software capable of bidirectional communication via network(s) 68 with payroll processor system 52. In this embodiment, each of first, second, and third tax authority systems 62, 64, and 66 is representative of a system of separate tax authorities. For example, first tax authority system 62 may be operated by or for the IRS, second tax authority system 64 may be operated by or for the Tennessee tax authority, and third tax authority system 66 may be operated by or for the New Jersey tax authority. Of course, the number of tax authority systems in bidirectional communication with payroll processor system 52 may vary from the three such systems illustrated in FIG. 1. Further, the communication with first, second, and third tax authority systems 62, 64, and 66 may be "universal", such as in using HTML supported in Internet applications, or may be proprietary to the particular tax authority by or for whom the tax authority system is operated.

It will be appreciated by those of skill in the art that network(s) 68 may comprise one or more networks well known in the art. For example, network(s) 68 may comprise the Internet or Internet II. Network(s) 68 may comprise one or more bidirectional communications networks, such as those provided over wire, fiber optics, satellite, infrared, radio frequency, or other media, or any combination thereof.

In the embodiment shown in FIG. 1, the functionality provided by the hardware and software comprising payroll processor system 52 is provided in what is known as an application service provider ("ASP") environment. In an ASP environment, users access payroll processor system 52 over one or more network(s) 68. In another embodiment, system 50 may only comprise payroll processor system 52 to which the user has access, such as through a workstation comprising part of payroll processor system 52. In this embodiment, payroll processor system 52 likely resides on one or more processors under the control of the user, and the software used to operate payroll processor system 52 was likely provided by one or more vendors of payroll processor software.

To supplement the understanding of system 50 illustrated in FIG. 1, consider a first employer that utilizes payroll processor system 52 for handling that first employer's payroll. Payroll processor system 52 is operated by or for a first payroll processor vendor. In this example, first employer controls first user system 54. Consider further that this first employer has employees in Tennessee and in New Jersey. Thus, first tax authority system 62 is operated by or for the IRS, second tax authority system 64 is operated by or for the Tennessee tax authority, and third tax authority system 66 is operated by or for the New Jersey tax authority. Further, in this example, remote database 60 stores payroll information for the first employer in a location remote from payroll processor system 52.

According to this example, during operation, the first employer, through first user system 54, enters payroll data. Such payroll data is received by payroll processor system 52 and stored on remote database 60 for further access by payroll processor system 52 and first user system 54. The first employer may also request creation of applicable tax forms for wage-related data. Such a request is made by the first employer at first user system 54. The request is communicated to payroll processor system 52. Payroll processor system 52 then determines which tax forms are required for the requested time period, accesses stored information in remote database 60, and presents portable data form ("PDF") files for the appropriate tax forms to the first employer at first user system 54. The first employer can then complete any information on such form(s) not known by payroll processor system 52, validate the completeness and accuracy of such form(s), correct the forms or modify information extracted from payroll processors system 52 to result in updating of the form, and, if desired, print the form(s) on printer(s) accessible to first user system 54. Further, if desired, the first employer may, through the bidirectional communication between first user system 54 and payroll processor system 52, request that the form(s) be electronically filed with the appropriate tax authority(ies). Payroll processor system 52 then sends the files electronically to one or more of first, second, or third tax authority systems 62, 64, or 66, as appropriate.

In the above example, the filing of electronic forms was handled through payroll processor system 52. It will be appreciated by those of skill in the art, that such filing may be handled without intervention of payroll processor system 52. In other words, first, second, and third user systems 53, 56, and 58, respectively, may be capable of sending such forms directly to first tax authority system 62, second tax authority system 64, and/or third tax authority system 66.

Figure 2:
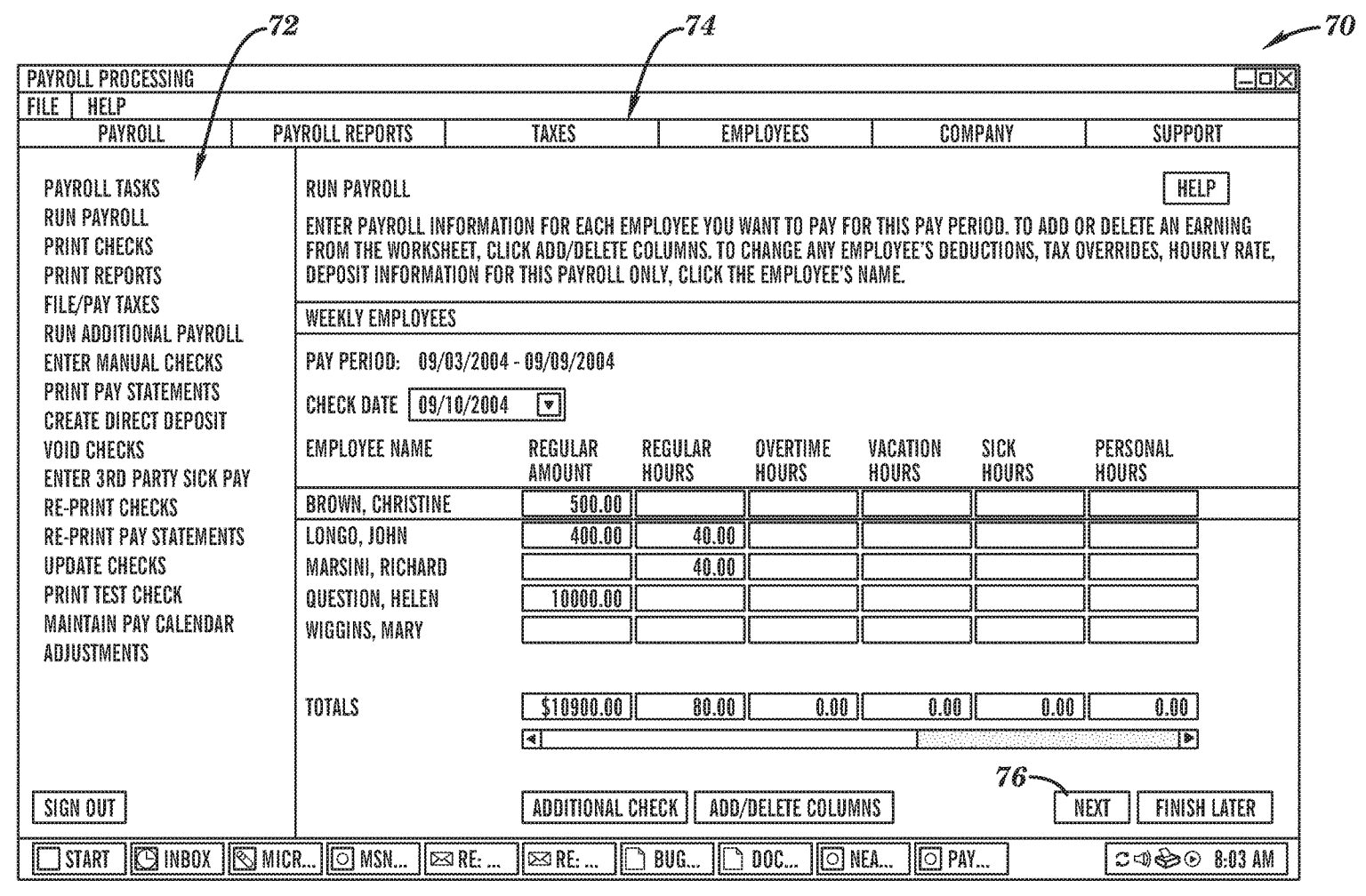

FIG. 2 shows a screen print of an interactive user screen at which a user may run the payroll for an employer according to one embodiment of the present invention. In this embodiment, screen 70 comprises an interactive user screen presented by payroll processor system 52 for the purpose of running the payroll for an employer. Payroll processor system 52, as illustrated in FIG. 2, also provides the user with other payroll-related functionality. Such payroll-related functionality is set forth on side menu 72, and includes "Payroll Tools", "Run Payroll", "Print Checks", "Print Reports", "File/Pay Taxes", "Run Additional Payroll", "Enter Manual Checks", "Print Pay Statements", "Create Direct Deposit", "Void Checks", "Enter 3$^{rd}$ Party Sick-Pay", "Re-print Checks", "Re-print Pay Statements", "Update Checks", "Print Test Check", "Maintain Pay Calendar", and "Adjustments". General functions of payroll processor system 52 are presented on tool bar 74. As illustrated, such general functions include "Payroll", "Payroll Reports", "Taxes", "Employees", "Company", and "Support".

As shown in FIG. 2, data is presented for five employees for the pay period of Sep. 3, 2004 through Sep. 9, 2004, with a check date of Sep. 10, 2004. According to the embodiment of FIG. 2, selection of Next Button 76 allows the user to process the employer's payroll dated Sep. 10, 2004. Once payroll data is processed in any quarter (period of three months in duration), payroll data can be run at the quarterly level. Similarly, once payroll data is processed in any period of one year in duration, payroll data can be run at the yearly level.

If the user selects "Taxes" in top menu 74, payroll processor system 52 proceeds to present information to allow the user to process taxes. Referring now to FIG. 3, there is shown a screen print of an interactive user screen at which a user may invoke the creation of tax forms according to one embodiment of the present invention. In this embodiment, screen 80 comprises top menu 74 which is the same as is illustrated in FIG. 2. Side menu 82 of screen 80 shows tax related functions operable by payroll processor system 52 available to the user from screen 80. As shown in FIG. 3, the choices for tax related functions are to "File Taxes" and "Set-up Company Tax". On screen 80, the user is able to select tax period year 84 and tax period quarter 86.

Based on the selected tax period year and quarter, payroll processor system 52 operates to present screen 80 containing information about the applicable tax forms. In this example, the employer has obligations in three tax jurisdictions, namely, the IRS, New Jersey and Pennsylvania. The determination of these obligations is determined by payroll processor system 52 based on data, such as the location of employees, as set forth by the tax law of the tax jurisdictions. The forms for federal obligations are listed in federal section 88, the forms for New Jersey obligations are listed in New Jersey section 90, and the forms for Pennsylvania obligations are listed in Pennsylvania section 92. The user may select on screen 80 any form listed in federal section 88, New Jersey section 90, and Pennsylvania section 92. Upon selection of such a form, payroll processor system 52 extracts relevant data for such form based on the specified tax period year and quarter, as is explained in greater detail herein, and displays a populated form in PDF format.

It will be appreciated by those of skill in the art that payroll processor system 52 may retain and/or have access to forms from a plurality of tax jurisdictions. Further, payroll processor system 52 may retain or have access to current forms as well as previous versions of forms for any tax jurisdiction. Consider, for example, a situation in which a state changes its forms from one calendar year to the next calendar year. The tax forms for both years can be accessible to payroll processor system 52 and access provided thereto on screen 80 based on the tax period (year and, if applicable, quarter) selected by the user.

Figure 4:
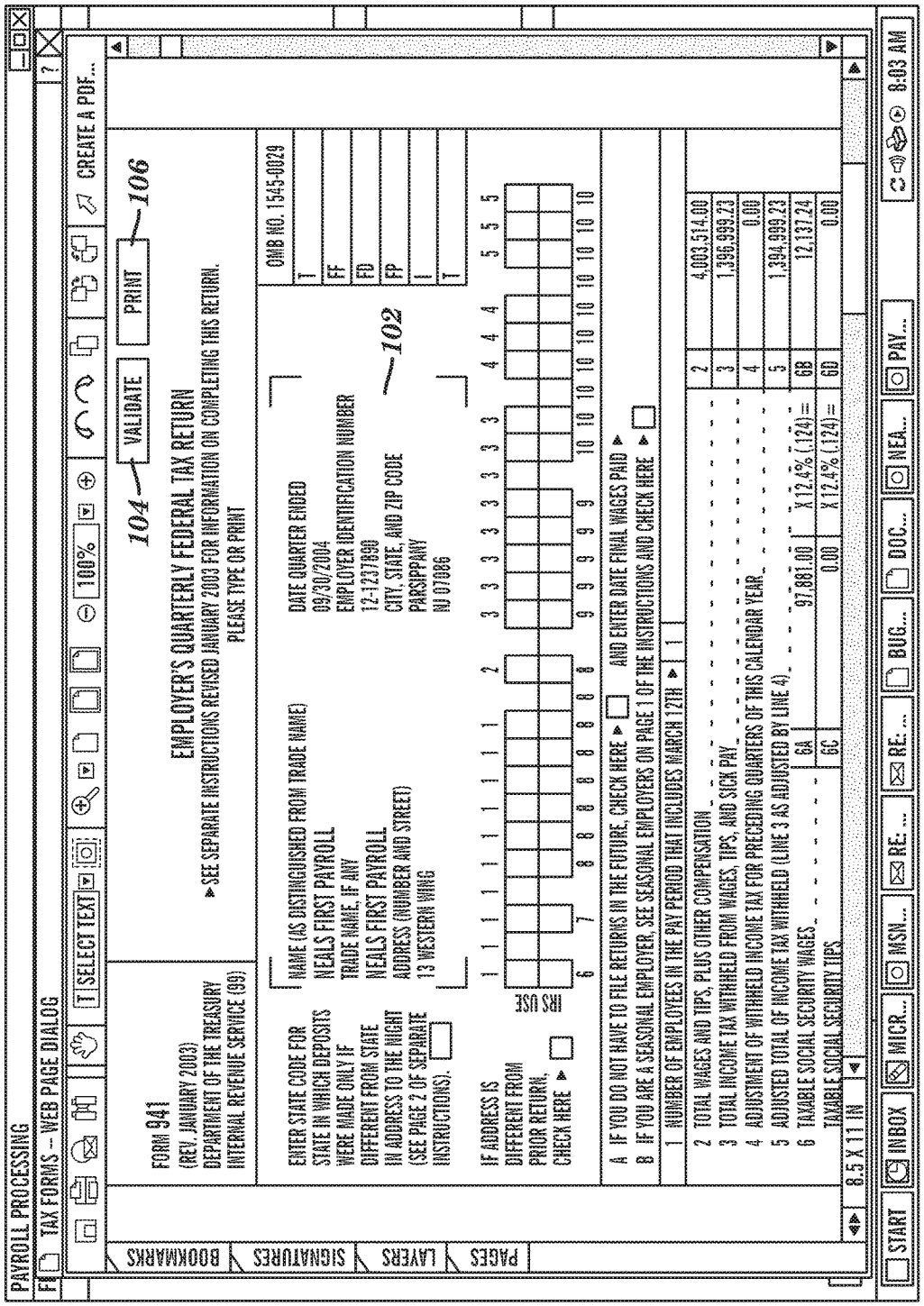
FIG. 4 shows a screen print of an interactive user screen presenting the top of a tax form according to one embodiment of the present invention.
Figure 5:
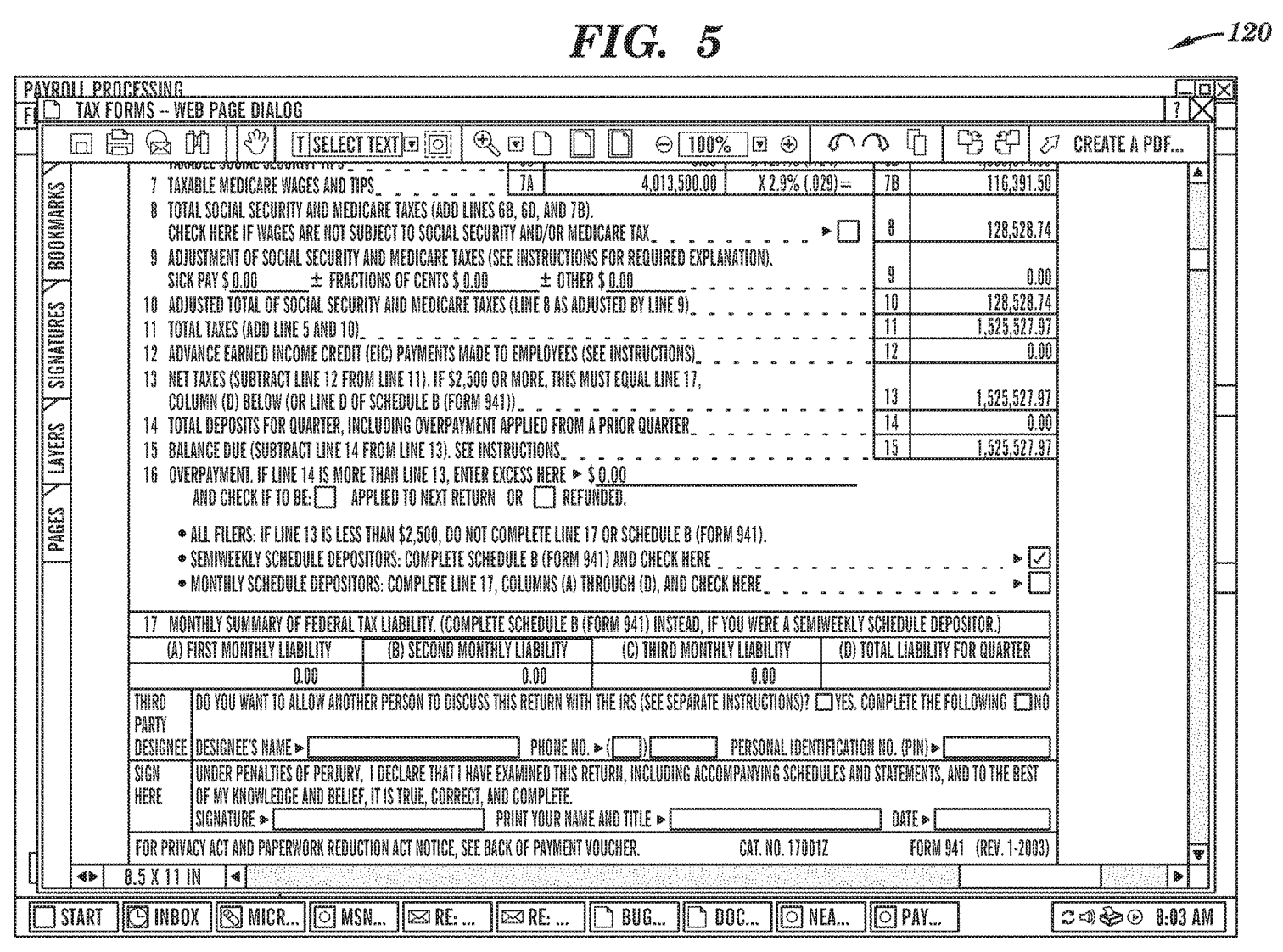

FIG. 4 shows a screen print of an interactive user screen presenting the top of a tax form according to one embodiment of the present invention. FIG. 5 shows a screen print of a the bottom of the tax form of FIG. 4. In this embodiment, the tax form illustrated in FIG. 4 and FIG. 5 is the first page of a Federal Tax Form 941—the Employer's Quarterly Federal Tax Return. Such Form 941 is presented to the user by selection of the "941 Employer's Quarterly Federal Tax Return" form listed in federal section 88 of screen 80 shown in FIG. 3.

In the embodiment of FIG. 4 and FIG. 5, screen 100 of FIG. 4 and screen 120 of FIG. 5 collectively comprise the first page of Form 941, and are displayed in a single "window". Form 941 is displayed using Adobe® Reader by Adobe Systems Incorporated, as Form 941 is stored by payroll processor system 52 in Adobe Systems Incorporated's portable document form ("PDF") format.

As shown in FIG. 4 and FIG. 5, certain fields of Form 941 have been populated by payroll system 52 by mechanisms described in greater detail herein. As seen on screen 100, the name, address, employer identification number, and date of the end of the quarter of address section 102 have been extracted by payroll processor system 52 and placed into the appropriate positions on the Form 941. In addition, certain other data has been extracted from payroll processor system 52 or calculations made from the extracted data in lines 2, 3, and 5 through 17 of Form 941 as seen on screen 100 and screen 120. In addition, the Semiweekly box has been checked between lines 16 and 17 as seen on screen 120.

According to the present invention, the user is permitted to change some of the fields of the tax form. In the embodiment of FIG. 4 and FIG. 5, the fields that can be changed by the user are illustrated as shaded boxes. For example, the value of "Adjustments of withheld income tax for preceding quarters of this calendar year" to be entered on line 4 of screen 100 may not be "known" to payroll processor system 52. The user can therefore enter the appropriate number in line 4, and all calculations based on the number in line 4 will be automatically updated on Form 941 by payroll processor system 52.

As shown in FIG. 4 and FIG. 5, the fields that are not shaded cannot be changed by the user. However, if changes are made by the user to payroll processing with payroll processor system 52, those changes are shown in the appropriate lines of the form upon reload of the form, or, in an alternate embodiment, automatically. For example, if the total wages and tips, plus other compensation for the quarter were changed by input(s) of the user in payroll processor system 52, the new total wages and tips, plus other compensation would be shown on line 2 of screen 100, and all calculations made in Form 941 based on that new total would also be changed. In this manner, the user does not have to be concerned about whether the appropriate numbers have been extracted from payroll processor system 52 and placed on the tax form(s).

Superimposed at the top of the window for screen 100 are Validate Button 104 and Print Button 106. If the user selects Validate Button 104, payroll processor system 52 checks the form for completeness and accuracy, as is described in further detail herein. In this manner, the user can be certain that he/she has entered all required information, has not edited one or more fields in a manner inconsistent with requirements for the tax form, or that unusual results are not generated in the completed form. If the user selects Print Button 106, the form is printed to a printer operably connected to the user's system.

It will be appreciated by those of skill in the art that activation of Print Button 106 results in printing of a PDF file. Because PDF files are such a standard, virtually all printers are able to print the completed tax forms. Thus, payroll processor system 52 does not require the accommodation of special print drivers, or of custom programming for different types of printers. Further, users are able to print their own forms, rather than relying on the delivery of forms printed by a payroll processor as is required in some of the prior art.

It will also be appreciated that, although the user is able to change or add data on a tax form, the user is only required to have Adobe® Reader from Adobe Systems Incorporated to read, write to, and print the PDF forms generated by payroll processor system 52. The user is not required to have Adobe® Writer from Adobe Systems Incorporated. This is advantageous because Adobe® Reader is provided at no cost to the user, while a license fee is required for Adobe® Writer.

Figure 6:
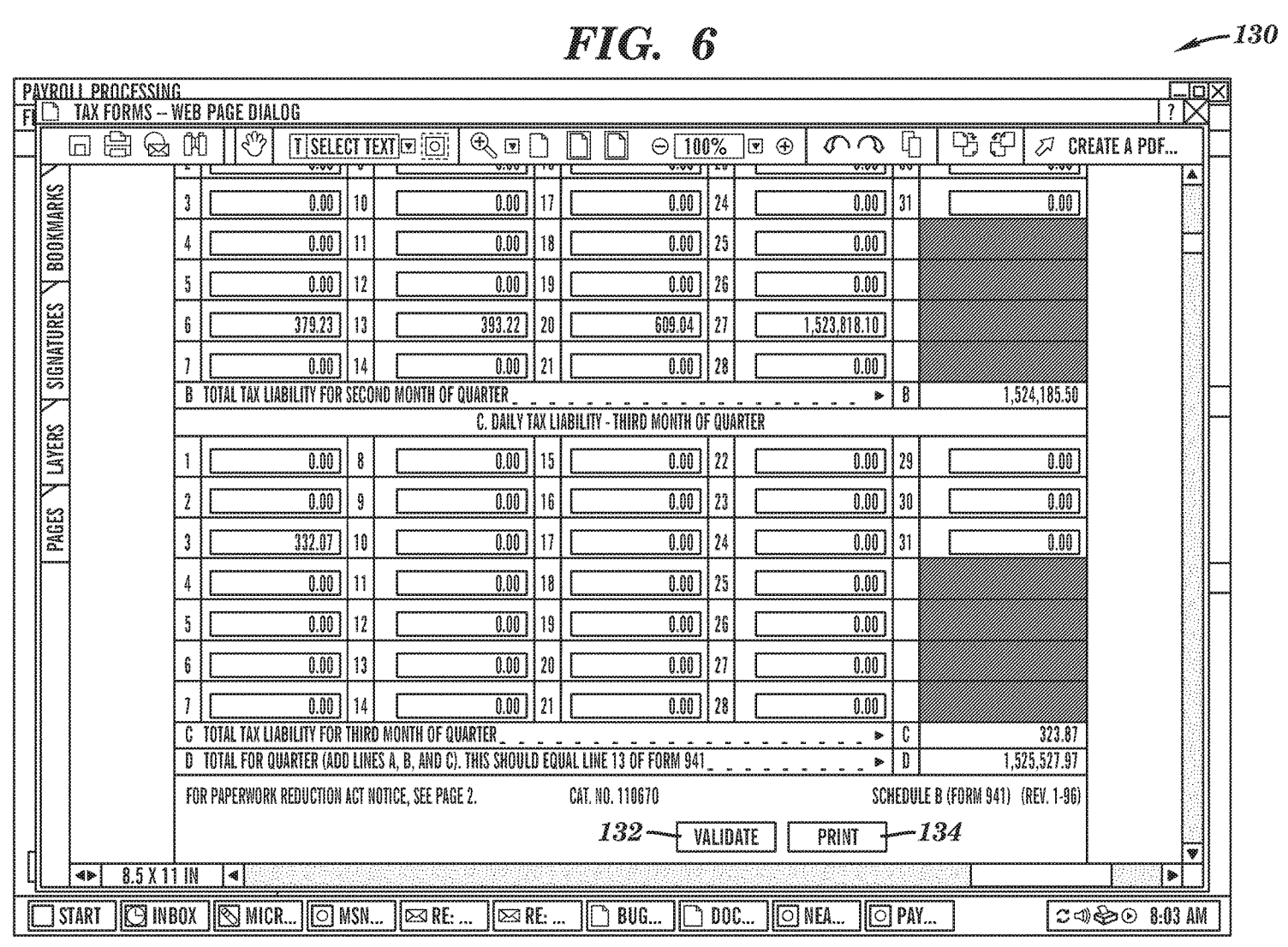

Referring now to FIG. 6, there is shown a screen print of an interactive user screen presenting a schedule to the tax form of FIG. 4 and FIG. 5 according to one embodiment of the present invention. Specifically, the schedule shown in screen 130 of FIG. 6 is used to complete line 13 of Form 941. Note that while many of fields of screen 130 can be edited by the user, line 13 of Form 941 as seen on screen 100 of FIG. 4 cannot be changed by the user. Instead, line 13 of Form 941 of screen 100 is updated in the event that the user edits any of the editable fields on screen 130 of FIG. 6.

Screen 130 of FIG. 6 includes Validate Button 132 and Print Button 134. As was discussed above in association with FIG. 4, Validate Button 132, if selected by the user, is used to validate the accuracy and completeness of the schedule shown on screen 130, and Print Button 134, if selected by the user, is used to print the schedule shown on screen 130.

It will be appreciated by those of skill in the art that validate and print buttons are useful for each tax form handled by payroll processor system 52. Thus, in one embodiment, validate and print buttons are presented at the top and bottom of the screens for each form.

Figure 7:
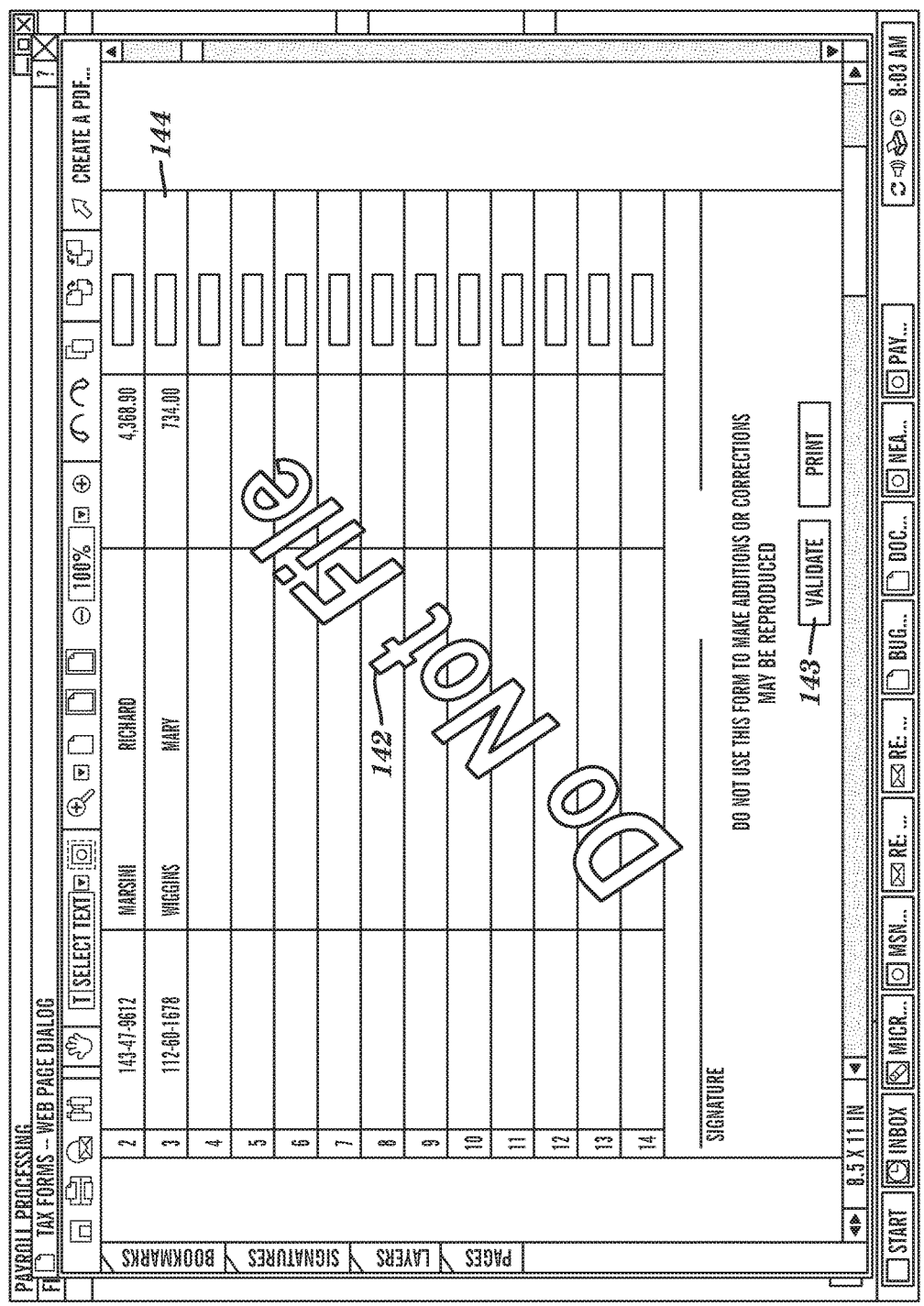
FIG. 7 shows a screen print of an interactive user screen presenting a second tax form according to one embodiment of the present invention.

Referring now to FIG. 7, there is shown a screen print of an interactive user screen presenting a second tax form according to one embodiment of the present invention. Screen 140 of FIG. 7 is shown upon selection by the user of the "NJ-927 Employer's Quarterly Report" form in New Jersey section 90 of screen 80 shown in FIG. 3. Screen 140 is a display of the PDF file for the NJ 927 form having data available to payroll processor system 52 extracted from payroll processor system 52 and populating the appropriate portions of the NJ 927 form for the selected tax year and quarter. Note that this form has watermark 142 of DO NOT FILE thereon. In this embodiment, the presence of watermark 142 arises when, upon initial display payroll processor system 52 determines that the form is not yet approved by the appropriate tax authority. In another embodiment, watermark 142 may be used by payroll processor system 52 to indicate that the form is incomplete, inaccurate, or inappropriate, or when the user attempts to validate the form by selecting Validate Button 143 and payroll processor system 52 determines that the form is not complete. In this example, the employer started use of payroll processor system 52 in the midst of the tax period quarter specified on screen 80 of FIG. 3. Thus, number of weeks fields 144 need to be completed for the NJ 927 form to be complete.

Figure 8:
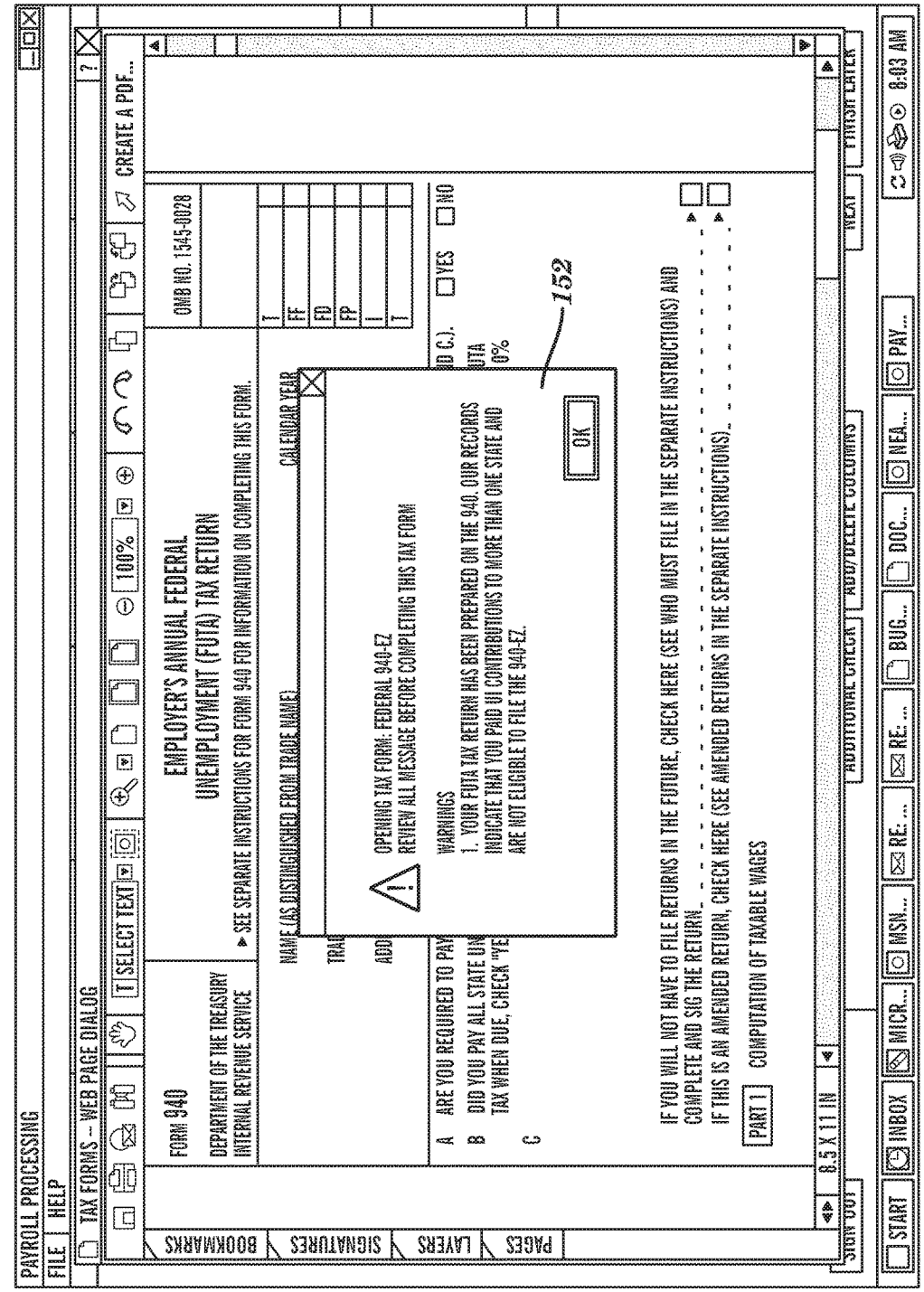
FIG. 8 shows a screen print of an interactive user screen presenting a third tax form with a dialog box according to one embodiment of the present invention.
Figure 9:
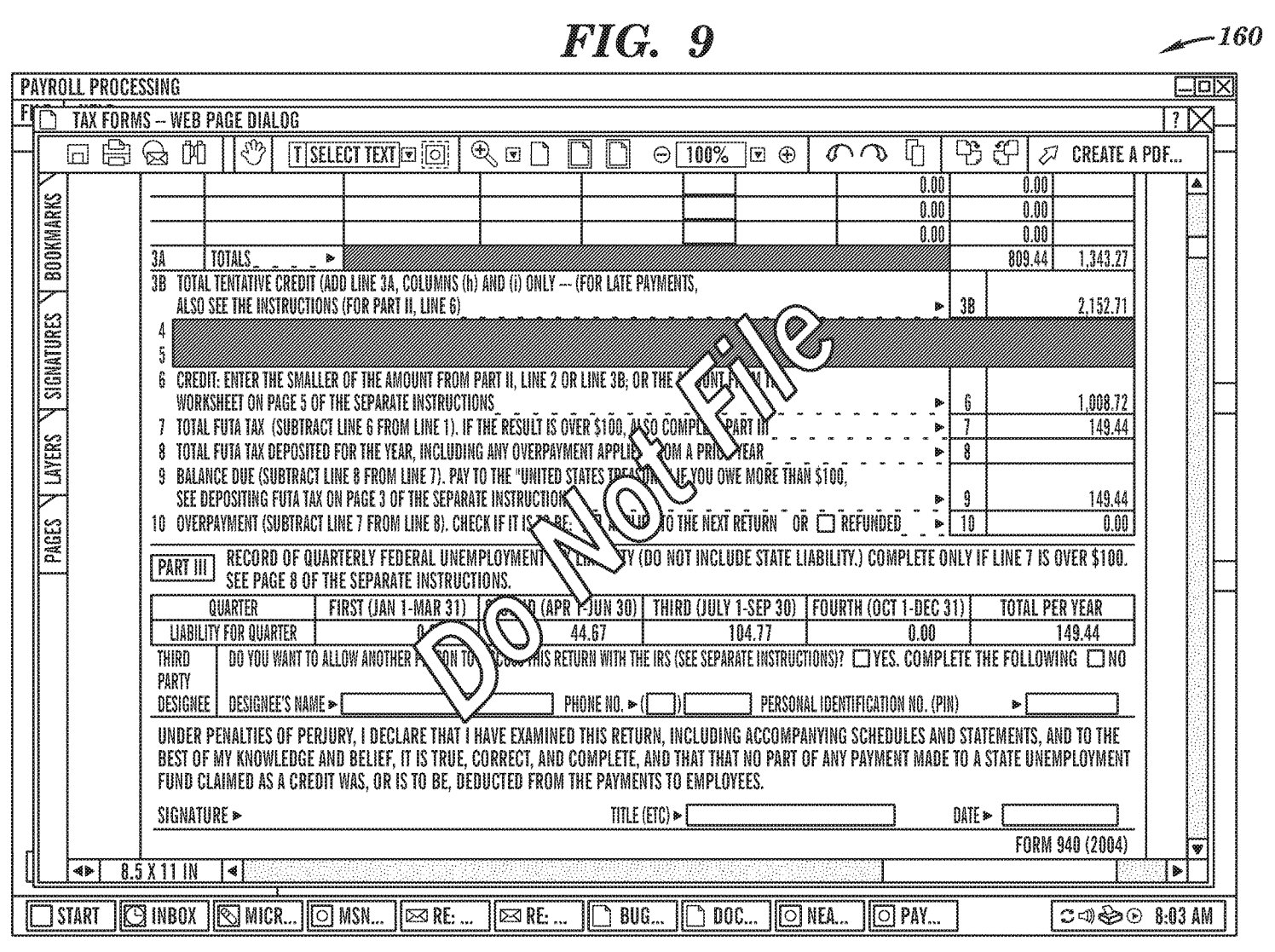

FIG. 8 shows a screen print of an interactive user screen presenting a third tax form with a dialog box according to one embodiment of the present invention, and FIG. 9 shows the second page of the tax form of FIG. 8. Screen 150 of FIG. 8 is invoked if the user selects the "940 EZ Employer's Annual Federal Unemployment (FUTA) Tax Return" form in federal section 88 of screen 80 of FIG. 3. Note that, in this example, screen 160 of FIG. 9 contains the DO NOT FILE watermark, for there are issues with this 940 EZ form. Specifically, the employer in this example, as shown in FIG. 3, has tax liabilities in two states, namely, New Jersey and Pennsylvania. According to federal tax laws, employers with liabilities in multiple states cannot use the 940 EZ form. Payroll processor system 52 recognizes this problem by checking the tax rules available to payroll processor system 52. Thus, overlaying the 940 EZ form on screen 150 of FIG. 8 is dialog box 152. Dialog box 152 explains to the user that the user cannot use 940 EZ, but instead must use the standard, or long, 940 form due to its liability in multiple states.

As illustrated in association with FIG. 8, the .PDF file generated by payroll processor system 52 is checked for preload, or preliminary errors. In this embodiment, detection of a preload error results in presentation of a modal pop-up Validation dialog box, namely, dialog box 152. In addition, payroll processor systems 52 may check the generated PDF file for any informational messages that may be helpful to the user. Generally, modal pop-up dialog boxes are displayed on top of the PDF form, and, because of the modal attribute of such boxes, no further activity within the browser instance are permitted until the "OK" button of the dialog box is selected by the user. However, the user is permitted to open other desktop applications when a validation dialog box is shown.

Figure 10:
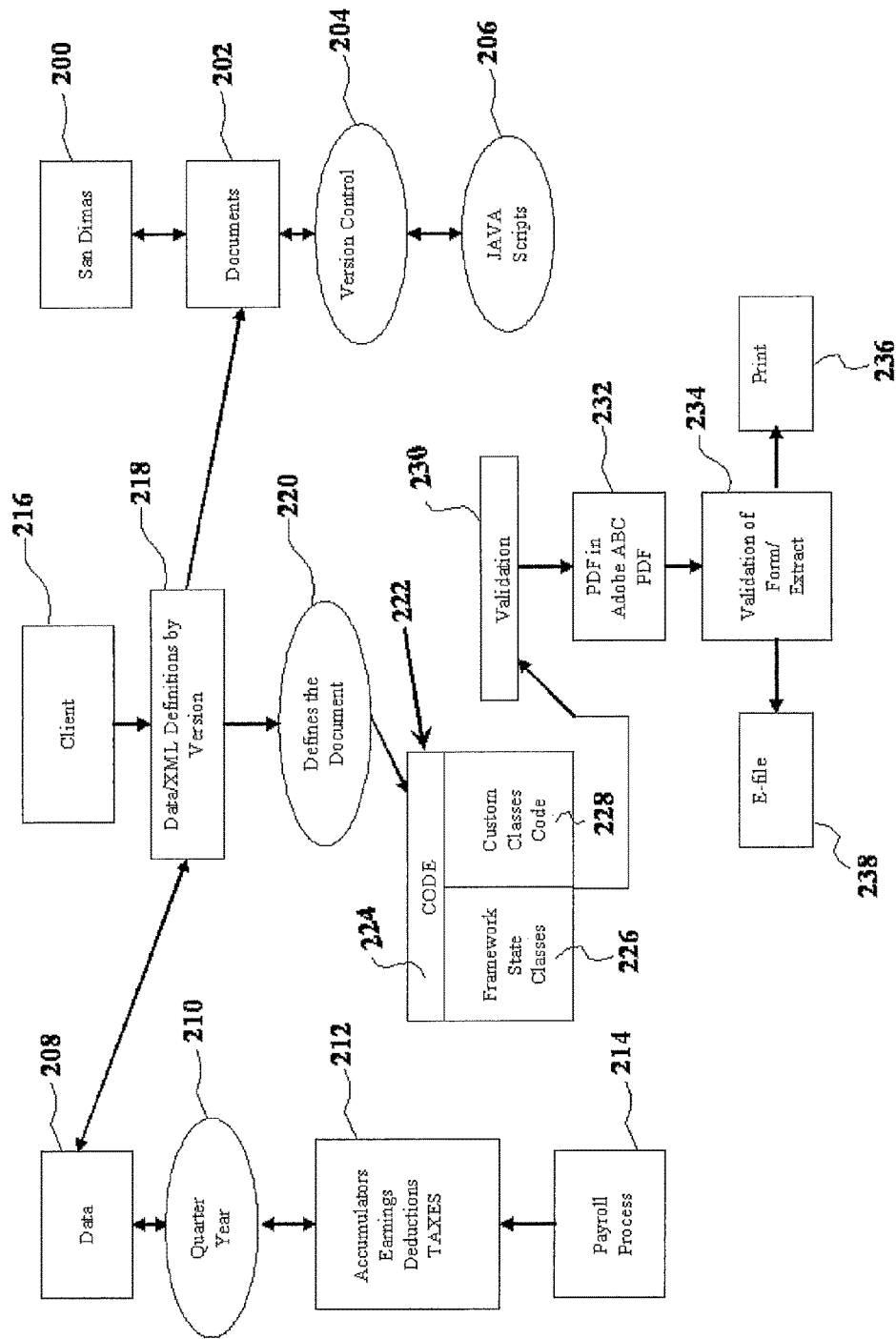
FIG. 10 shows a flow diagram of one embodiment of the process for handling tax forms according to the present invention.

Referring now to FIG. 10, there is shown a flow diagram of one embodiment of the process for handling tax forms according to the present invention. In this embodiment, remote server 200 resides in a location remote from payroll processor system 52 and user systems 54, 56, and 58 (See FIG. 1). Operably connected to remote server 200 is documents database 202. Documents database 202 is operably connected to version control subsystem 204 for management of the documents stored in documents database 202. Versions of such documents of documents database 202 are operated upon by JavaScripts 206.

In the embodiment of FIG. 10, data 208, quarter year processes 210, accumulators 212, and payroll process 214 relate to data collected by payroll processor system 52. Specifically, based on payroll process 214 (payroll processing functionality of payroll processor system 52), earnings, deductions, and taxes can be accumulated by accumulators 212 for the quarter or year established by quarter year 210 to produce data for population into the tax forms according to the present invention.

At 216, the client (user) invokes the process to create a tax form. One embodiment of the invocation of tax forms was discussed above. Data/XML definitions by document version are established at 218 based on the tax period specified by the user and the corresponding document version as stored in documents database 202. Next, the document is defined at process 220. Payroll processor system 52 comprises programs 222 to populate the forms and make in-inform calculations. These programs 222 comprise code 224, such as that discussed in association with the Appendix. Programs 222 also comprise framework state classes 226 and custom classes code 228. Framework state classes 226 is code that interacts with every PDF file in the same manner. Examples of framework state classes 266 are page numbering and defining a field name such as an address to print "x" number of characters. Custom classes code 226 is code that extends the framework for a specific form. An example of the application custom classes code 226 is, if the address field framework picks up 40 characters, but the form address line can only handle 20 characters.

As discussed above, preliminary validation 230 occurs according to rules established in payroll processor system. Display process 232 causes the PDF form, populated and with in-form calculations, to be displayed. Such display may present any errors determined in preliminary validation process 230, as shown in FIG. 8, for example, and any DO NOT FILE watermark, as shown in FIG. 9, for example. Once the PDF file is displayed, the user may enter other information on the form as discussed hereinabove.

Once the user believes that the tax form is complete, the user may request validation 234, such as discussed above. Further, the user may invoke print process 236 and/or electronic file process 238 for printing and/or electronic filing of the PDF tax form.

According to one embodiment, substantially all processes illustrated in FIG. 10 may be located at payroll processor system 52. Alternatively, some functions may be located remote to payroll processor system 52. In another alternative, many of the processes may reside at a system under the control of a user.

In one embodiment of the present invention, the PDF documents that comprise the tax forms are stored, maintained, and updated at a location remote from the location of payroll processor system and user systems 54, 56, and 58, such as documents database 202 connected to remote server 200 as shown in FIG. 10. In another embodiment, documents database 200 may comprise a conventional SQL database containing tabular data that describes the structure of each PDF template. Such tabular data may comprise, for example, the field details, statutory filing window, and the location of the template file on the disk. In this embodiment, payroll processor system brings up the tabular data to create PDF templates that are loaded into memory and then form a combined data structure. Regardless of whether a documents database actually contains PDF templates or tabular data to create PDF templates in memory, such a documents database may also be located in the same location as payroll processor system 52 or a part of payroll processor system 52.

As described herein and in the claims, there are two databases containing information that are accessed by payroll processor system 52. The first database contains data used by payroll processor system 52 for payroll processing functions. Thus, the first database generally contains data about at least one employer who utilizes payroll processor system 52. Such "data about an employer" may comprise identifying data, such as the name, address, employer identification number, or other data about the employer. Such "data about an employer" may also comprise wage data applicable to the employer. Wage data about the employer may comprise, for example, the names, identifying information, and wage data for each of the employees, the locations of the employees, and accumulated or calculated information about the wages paid to the employer's employees.

Generally, the system of the present invention includes a first database, a second database, and a processor. The first and second databases are operable connected to the processor, such as by a network. The first database contains data about the one or more employers that utilize the payroll processor system operated by the processor. The second database contains "PDF templates" for the tax forms made available to the employers. The term "PDF templates" is used to describe actual templates of the forms stored on the second database and to describe tabular forms stored on the second database and converted into templates of the forms in memory accessible to the processor.

The processor is operable to produce filable PDF tax forms from the PDF templates. The processor is further operable to place data on the filable PDF tax form. Such data placed on the filable PDF tax form may include data extracted directly from the first database, or data calculated from one or more of data stored on the first database. Thus, the filable PDF tax form produced by the processor may contain extracted and/or calculated data.

The processor used to produce the filable PDF tax form may comprise the processor of the payroll processor system, a remote user system, or a combination thereof. For example, in an embodiment where the payroll processor system is made available in an ASP environment, the processor of the payroll processor system may retrieve the PDF template from the second database and extract the data required for the form from the first database, perform any calculations (percentages, totaling, etc.) necessary for the form, and create a PDF file therefrom. The processor of the payroll processor system may also handle the entry of data on the form as presented on the remote user system. The remote user system may then actually generate the filable PDF tax form from the PDF file created by the processor of the payroll processor system, with such filable PDF tax form populated with the extracted and calculated data. Such population of the filable PDF tax form is, in this example, performed by execution of one or more programs residing in the PDF file generated by the processor. The remote user system also displays the filable PDF tax form to the user.

In an application where the payroll processor system is under the control of the user, all functions may be performed by the processor of payroll processor system. Of course, any number of processors at a single or various locations may be used to achieve the results of generation of filable PDF tax forms.

In one embodiment of an ASP system, the processor of payroll processor utilizes C++ programs to perform calculations made in the form. In this embodiment, the remote user system executes JavaScript programs embedded in the PDF file produced by the processor of the remotely located payroll processor system to generate the filable PDF tax form and to extract and populate the filable PDF tax form with data from the first database. Specifically, such embedded JavaScript programs are executed by Adobe® Reader upon loading of the PDF file.

The method of the present invention involves few steps, and is therefore efficient. First, the processor retrieves a PDF template from the second database. In one embodiment, the actual template retrieved is based on input, such as tax period, as well as information known by the payroll processor system, such applicable tax jurisdictions and required forms for that tax jurisdiction. The processor also retrieves at least one data about the employer from the first database. Such data may include employer data and/or wage related data. Then, payroll processor system produces a filable PDF tax form from the retrieved PDF template with the filable PDF tax form containing the retrieved data about the employer.

It will be appreciated by those of skill in the art that the number of processes required to complete tax forms containing data collected in a payroll processor system are few. Also, the processes are simple, and are therefore efficient and effective in operation, and are easy to maintain.

FIG. 11 shows a table of system data for the header section for the Federal Tax Form 940 according to one embodiment of the present invention. The header data for Federal Tax Form 940 discussed in this example requires the identification of the name of the filer, calendar year, trade name (if any) of the filer, employer identification number, and address of the filer. As indicated in the table of FIG. 11, system data for payroll processor system 52 to represent this header data includes the field reference, field text, field data type, field format/mask, maximum field length, whether the field is to separate the dollar and cents fields, any special naming convention, mapping details, and field calculation logic. The field reference, field text, field data type, field format/mask, maximum field length, and the indicator as to whether the field is to have separate dollar and cents fields relates identification and to the display of the field on the tax form. The special naming convention data relates to define sections of the form that repeat. For example, if the social security number of an employee is required in nine locations in the firm, special naming conventions are used to distinguish the nine separate locations.

The mapping detail is an indication of how the data is to be "entered" onto the tax form. With regard to the header section of Form 940, all fields are "entered" by extraction of data from payroll processor system 52 and the tax form is populated with such extracted data. The manner in which such data is extracted is expressed in terms of the a program executed on payroll processor system 52. For example, program ADP_CODE_SETUP.Legal_name is executed to extract the name of the filer from payroll processor system 52. Such programs are written in C++.

The field calculation logic column specifies whether the field is one that is calculated from other fields, and, if so, how such calculation is made. With regard to the header section of Form 940 presented in this FIG. 11, no fields are calculated from any other field. Instead, all fields are mapped to data extracted from payroll processor system 52.

Referring now to FIG. 12A and FIG. 12B, collectively, there is shown a table of system data for the Main section of Federal Tax Form 940 according to one embodiment of the present invention. For the main section of the Form 940, various questions are asked of the filer. The table of FIGS. 12A and 12B therefore refers to various "yes" and "no" check boxes that must be completed by the client. Thus, the mapping detail for each of these fields is designated as "client input", and no field calculation logic is required for these fields.

Together, FIG. 13A and FIG. 13B show a table of system data for the Computation of Wages section of Federal Tax Form 940 according to one embodiment of the present invention. These fields refer to Part I, lines 1, 2a, 2b, 3, 4, and 5 of Form 940. Some of the fields, such as that of line 1, are extracted from payroll processor system 52, while others are based on client input. Lines 4 and 5 are determined by calculation. Specifically, as indicated in the field calculation logic column, line 4 is calculated by adding the fields of line 2b and line 3, and line 5 is calculated by subtracting the field of line 4 from the field of line 1.

Referring now to FIG. 14, there is shown a table of system data for the Payment Voucher accompanying Federal Tax Form 940 according to one embodiment of the present invention. The payment voucher extracts the employer identification numbers from payroll processor system 52, and requires the client to input other information, such as the payment amount. In this embodiment, client identifying data is input by the employer so that the employer, rather than the payroll processor, is required to provide correct information accompanying the payment voucher. However, it is within the scope of the present invention for such information to be extracted from payroll processor system 52 rather than be entered by the client.

FIG. 15A, FIG. 15B, FIG. 15C, FIG. 15C, FIG. 15D, FIG. 15E, FIG. 15F, and FIG. 15G collectively show a table of system data for the Part II, Tax Due or Refund, section of Federal Tax Form 940 according to one embodiment of the present invention. In this system data table, the fields are a combination of calculated data (such as the gross FUTA tax), and data extracted from payroll processor system 52 (such as the name of the state). Note that the system of the present invention is able to handle alternative situations. For example, an if-then-else structure is used to determine the taxable payroll field presented on FIG. 15C. If the experience rate or the state unemployment insurance identifier ("SUI ID") has not changed for the year in process, an in-form calculation is made by subtracting line 4 of Part I from line 1 of Part I. Otherwise, the taxable payroll is determined by summing extractions of certain data from payroll processor system 52.

Referring now to FIG. 16A and FIG. 16 B, there is shown, collectively, a table of system data for the Record of Quarterly Unemployment Tax Liability section of Federal Tax Form 940 according to one embodiment of the present invention. In this Part III of Form 940, the tax liabilities for each quarter are extracted from payroll processor system 52, and to total liability for the year is calculated by summing all liabilities for all four quarters.

FIG. 17 shows a table of system data for the third party designee section of Federal Tax Form 940 according to one embodiment of the present invention. The third party designee section of Form 940 identifies any third party, such as an accountant, that may be contacted regarding the Form 940. Thus, the fields for this section of the Form 940 require client input.

Referring now to FIG. 18, there is shown a table of system data for the footer of Federal Tax Form 940 according to one embodiment of the present invention. This footer relates to the signatory of the Form 940. Thus, the title of the signatory and the date signed are entered by the client.

FIG. 19A, FIG. 19B, FIG. 19C, FIG. 19D, FIG. 19E, and FIG. 19F collectively show a table of system data for validation of Federal Tax Form 940 according to one embodiment of the present invention. Payroll processor system 52 is capable of posting errors in preparing the employer's tax forms. Such errors may be presented in a dialog box, such as dialog box 152 of FIG. 8, or presented to the user by other mechanisms well known in the art. Presented in the table of FIGS. 19A, 19B, 19C, 19D, 19E, and 19F are the rules related to completion of the field on the Form 940, the error message to be posted if the rule is not satisfied, tier, pre-load check, and the type of error. In this embodiment, "tier" refers to different types of services provided by a payroll processor operating payroll processor system 52. For example, Tier 1 customers may be those provided with basic payroll services with printable tax forms and no electronic filing services. Tier 2 customers may also engage the payroll processor to electronically file tax forms and to make tax payments for the customer, and Tier 3 customers may receive all payroll services made available by the payroll processor. Pre-load check refers to whether payroll processor system 52 should validate the rule for this line before the form is loaded and presented to the user. The type of error is discussed later herein in association with FIG. 20.

Referring now to FIG. 20, there is shown a table of error type descriptions according to one embodiment of the present invention. In this embodiment, three types of errors are handled by payroll processor system 52. An "Error" type error indicates that the data is inaccurate, invalid, or missing. A "Warning" type error provides an alert that the data may be inaccurate or missing. An "Informational" type error is an informational message pertaining to electronic filing of the tax form, or identifies that the client needs to perform some action. The columns designated as "Tier 2 Impact" and "Tier 1 & 3 Impacts" mean specific actions to be taken based on the type of customer served by the payroll processor operating payroll processor system 52, as discussed earlier herein.

FIG. 21 shows a table of additional system data if the Federal Tax Form 940 is to be filed electronically according to one embodiment of the present invention. If the employer desires to electronically file the Form 940 and if the client has identified any exempt payments (line 2 of Form 940), an exempt code and exempt wage must be specified. According to one embodiment of the present invention, an E-File Button may be shown at the beginning and end of the tax form. For example, such an E-File Button may be placed next to Validate Button 104 and Print Button 106 of FIG. 4, and next to Validate Button 132 and Print Button 134 of FIG. 6. Alternatively, or in addition, an E-File option may be available in one of the Adobe menu items presented in the window when the form is displayed.

Referring now to FIG. 22A and FIG. 22B, there is shown, collectively a table of rules for reformatting data from the Federal Tax Form 940 for electronic filing according to one embodiment of the present invention. The reformat rules of FIGS. 22A and 22B are those that must be applied when passing data electronically to the IRS, as the IRS requires certain formats for certain fields. For example, the experience rate must be in the format #.###### when sent electronically.

According to one embodiment of the present invention, upon selection by the user of electronic filing of a form, such as by selection of the E-File Button discussed above, payroll processor system 52 first invokes a validation of the form to check the form for errors. Validation is performed for both tax form messages and framework messages. Tax form messages are those messages that result from tax form validation and identify issues pertaining to the data on the tax form. An example of such tax form errors are presented herein in FIGS. 19A, 19B, 19C, 19D, 19E, 19F, and 19G for form 941. Framework messages pertain to the e-filing status of the user and the conditions under which the E-File Button is displayed. Examples of framework messages include:

| Message | Message Type |
|---|---|
| e-file is not enabled at this time. Your enrollment authorization is pending. | Error |
| e-file is not enabled at this time. The processing window for the selected reporting period is not valid. | Warning |
| e-file is not enabled at this time. This tax form has already been filed electronically. | Warning |
| e-file is not enabled at this time. You do not have the appropriate role level security. | Warning |

Figure 23:
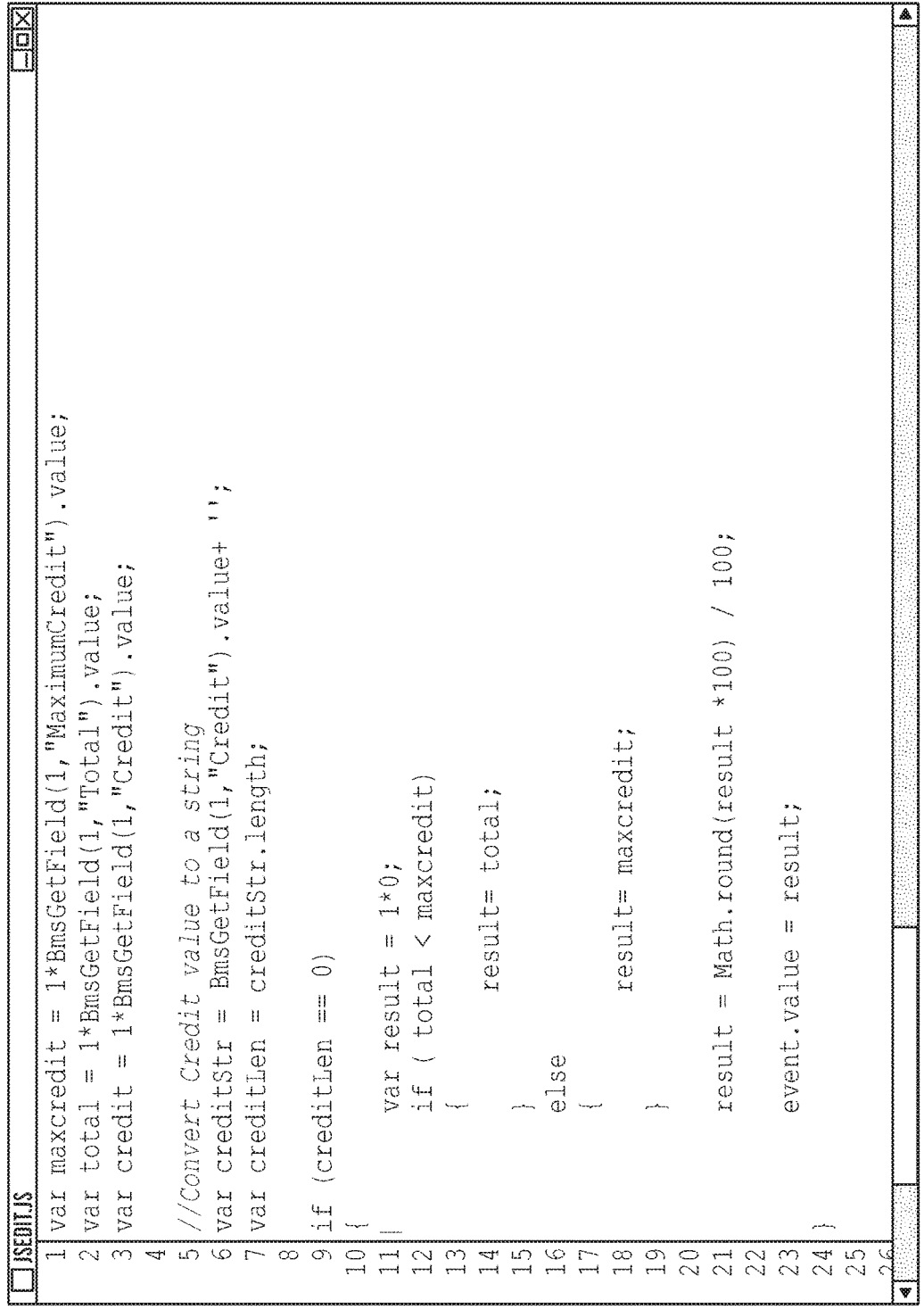
FIG. 23 shows a screen print of a JavaScript program used with one embodiment of the present invention.

Referring now to FIG. 23, there is shown a screen print of a JavaScript program used with one embodiment of the present invention. The JavaScript program of FIG. 23 is used to calculate Part II, line 6 of form 940 (See FIG. 9). This line of form 940 is a credit, which is the smaller of the amount from Part II, line 2 or line 3b or the amount from the worksheet on page 5 of the separate instructions for the form 940. The JavaScript of FIG. 23 is executed after retrieval of the stored PDF template for form 940, to cause the value of Part II, line 6 to be placed in the revised PDF file that is displayed to the user. In the embodiment of FIG. 23, BMSGetField( ) is equivalent to ADPGetField( ) discussed earlier herein.

Attached hereto as an Appendix is a source code listing of a method used to populate data into a PDF file. The code is written in C++ and utilizes the ABCpdf.NET software library known by the trade name WebSupergoo™ and provided by Finn Enterprises Ltd., 11 Queens Road, Brentwood Essex CM14 4HE, England. ABCpdf.NET allows one to create dynamic PDF content, and is operable in the .NET environment using standard NET structures and classes. However, ABCpdf.NET has limited capabilities in filling in field values. Thus, for the present invention, programs were developed for the purpose of populating the PDF file with data. In addition, ABCpdf.NET does not interact with the user interface of payroll processor system 52 or the electronic forms database of system 50. Further, ABCpdf.NET has no tax form functionality. Therefore, ABCpdf.NET is only used to customize the tax form templates in memory for access by payroll processor system 52 display to the user, and storage in the electronic forms database of system 50.

The SetFieldValue( ) method of the Appendix requires the fieldID, Ff, and FT values in addition to the actual data value. Ff and FT are representative of field attributes of the same name used by Adobe Systems Incorporated's PDF Reference specification, and refer to field flag and field type, respectively. Ff is generally used to represent various types of attributes (read only, push button, password, etc.), and FT is used to represent the type of field (button field, choice field, or text field, for example). The fieldID is representative of the identifier for the field. The Ff and FT values are obtain by querying each PDF file in turn using the fieldID. The fieldID is obtained using a line of code similar to the following:

Int fieldID=Int32.Parse(_pdfTemplate.GetInfo(_pdfTemplate.Root, "Field 'x'"));

The code of the Appendix illustrates how low level the forms filling functionality of ABCpdf.NET is. Note how, in the first function, a query is made for obscure values to determine what type of PDF form button is able to be set.

As discussed above, PDF templates for the tax forms handled by payroll processor system 52 are stored and made available to payroll processor system 52. During operation, when a tax form is desired to be viewed or filed, payroll processor system 52 retrieves the appropriate template for the form. Payroll processor system 52 creates a new PDF tax form from the template. To create the new PDF tax form, fields and formulas are copied along with the PDF document layout from the retrieved template. At this point, the form is not sent to the user's web browser, because it is possible that there may exist clashing field names in the new compound document, and, furthermore, field references in formulas may be ambiguous.

The possibility of duplicate field names is attended to by renaming all field names in the compound document according to their relative page position. The possibility of ambiguous formula field references is attended to indirectly by using a function that is added to every PDF document. Calls to this function are inserted dynamically into formulas by payroll processor system 52 during the servicing of each end user request. For example, var totalTax=this.getField("employeeTax")+this.getField("employerTax");

becomes var totalTax=ADPGetField(2,"employeeTax")+ADPGetField(2,"employerTax");

according to one embodiment of the present invention.

Another feature of the system and method of the present invention relates to continuation and supplemental forms. Some tax forms have a total field that is valid for display when a form is delivered as a single page. In more complex multi-page or multi-form (such as the combination of a form and a supplement to the form) scenarios, payroll processor system 52 must customize the formula totaling logic. Also, a stitched document scenario arises when the total of employees exceeds the capacity of a single tax form, for example. In this case, the total fields may need to be suppressed in all but the last page of the compound document. Payroll processor system 52 has the capability to handle multi-page, multi-form, and stitched documents scenarios, and accomplishes the same through the use of general routines to implement such formula customization at runtime based on the definition of the individual PDF tax document pages stored and accessible to payroll processor system 52.

According to the present invention, if a tax form has a corresponding continuation/supplemental form, the continuation sheet is dynamically linked to the main form during form launch based on the necessity of the continuation/supplemental form. Continuation/supplemental forms are not listed separately on the File Taxes page unless such a form also serves as a stand-alone form for additional tax information. Tax forms that have continuation/supplemental forms include the term "Continuation Sheet" or "Supplemental" as part of the form name. Such designations signify that such a continuation or supplemental form will be included when the main form is launched.

In one embodiment of the present invention, a program known as IPSYS_EFORM_FORM.ContinuationBehaviour instructs the framework about the manner to distribute repeating data across a primary and continuation/supplemental form(s) at runtime. The framework only looks at the ContinuationBehaviour value as defined against the primary form. In this embodiment, possible values of ContinuationBehaviour are:

ContinuationBehaviour=0 corresponds to the default way to distribute repeating data across primary and continuation/supplemental forms. Repeating data is written to the primary tax form page with overflowing data written to one of more tax form continuation/supplemental sheets. The overflowing limits are defined within IPSYS-EFORM_FIELD using the columns RepeatingDataItem, RepeatingInitialRowSeed, RepeatingIncrement, and RepeatingMaxRowCount. An example of such a form is the State of California DE6 Quarterly Wage and Withholding Report.

ContinuationBehaviour=1 specifies that if one of more continuation/supplemental pages are required, all repeating data is written to the continuation/supplemental pages(s) with no repeating data existing on the primary page. If a continuation/supplemental page is not required, the repeating data is held on the primary page. Overflow limit definitions are the same as detailed in ContinuationBehaviour=0 above. An example of such a form is the New York State NYS-45-ATT-MN Quarterly Combined Withholding, Wage Reporting and Unemployment Insurance Return—Attachment.

ContinuationBehaviour=2 specifies that all repeating data is held on one or more continuation/supplemental pages. The primary page does not accommodate the storing of repeating data in all cases. The subtle difference between this situation and that when ContinuationBehaviour=0 is that when ContinuationBehaviour=2, if there is any repeating data at all, it will always be thrown onto a continuation/supplemental sheet. With ContinuationBehaviour=1, repeating data may still be contained on the primary page if a continuation/supplemental page is not required. Overflow limit definitions are the same as detailed in ContinuationBehaviour=0 above. An example of such a form is the Texas C3 & C4 Employers Quarterly Report and Continuation Sheet.

For some multi-page forms, more than one page of the form may contain postal address fields. According to one embodiment of the present invention, payroll processor system 52 automatically propagates address amendments, typed in-form by the user on the first page, into other pages of the form. Such propagation of address information further enhances the ability of system 50 to handle multi-page forms in an efficient manner for the user.

It will be appreciated by those of skill in the art that the system and method of the present invention allow a user to control printing of the necessary tax forms. It will also be appreciated that, by the use of a standard format, the printing of the tax forms is independent from the type and make of printers available to the user. The present invention generates forms accepted, and preferred, by the tax authorities, and ensures accessibility, accuracy, and compliance in completing forms for all appropriate tax authorities.

It will be further appreciated that the present invention effectively uses information required by the tax authorities as known to the payroll processor system. Thus, the user need not make manual entries of general information or wage-related information known to the system. The user of the present invention is permitted to add information to the forms, when such information is not already known to the payroll processor system.

The present invention further permits for automatic selection the applicable tax authorities, and of the appropriate versioned tax forms for such authorities according to the filing period selected. In addition, the appropriate versioned tax forms are selected when historical data is requested. In addition, the system automatically determines whether continuation pages are needed to handle additional information, such as is often required for an organization with many employees. Further, the presentation of the forms in PDF format are easy to read, and provide the user with quick visual information about the contents and/or the completeness of the information.

It will be yet further appreciated that the system and method of the present invention may be used for a variety of different forms. While the discussion hereinabove specifically discloses state and federal tax forms, the present invention is also applicable to tax forms from other tax authorities, such as local tax authorities and foreign tax authorities. Further, the system and method of the present invention is applicable for other forms that use data accessible to the payroll processor system, such as form requiring the name, address, tax identifier, or other company data, for example.

The validation functions of the present invention allow the user to validate the accuracy and completeness of the form. The use of watermark images on the forms to designate a form that has not yet been validated or which contains an error are useful in alerting the user to such problems. Further, the validation functions apply addition logic for electronic filing of such forms, when applicable, according to the user's enrollment status. By injecting the validation code into the PDF tax form, immediate in-form validation user feedback is provided, even for minor validation rules.

The forms framework of the present invention implements a separation between form level business logic and the mechanics of the PDF document assembly. Tax form and electronic filing developers need no knowledge of PDF technology for development of additional forms for printing or electronic filing. Further, the forms framework of the present invention is an independent subsystem that could be used in other products. This independence from the remaining functions of the payroll processor system is achieved through the user of runtime module loading, and tax form data extract and validation modules are referenced in the forms database.

It will also be appreciated by those of skill in the art that the system and method of the present invention is able to handle calculations, such as totals, that are made from continuation and/or supplemental forms. Thus, the system is capable of handling multi-page, multi-form, and stitched documents in addition to simple one-page tax forms.

As used in the claims, the term "filable PDF tax form" means a form in PDF format, and includes, but is not limited to federal tax forms, state tax forms, local tax forms, foreign tax forms, and other forms having data that can be extracted from and/or calculated from a payroll processor system. In addition, the term "tax form" as used in the claims means a form, including but not limited to federal tax forms, state tax forms, local tax forms, foreign tax forms, and other forms having data that can be extracted from and/or calculated from a payroll processor system.

While the present invention has been described in detail with reference to certain exemplary embodiments thereof, such are offered by way of non-limiting example of the invention, as other versions are possible. Moreover, a number of design choices exist within the scope of the present invention, some of which have been discussed above. It is anticipated that a variety of other modifications and changes will be apparent to those having ordinary skill in the art and that such modifications and changes are intended to be encompassed within the spirit and scope of the invention as defined by the following claims.

We claim:

1. A payroll processor system, comprising:
a first database comprising at least one data pertaining to an employer;
a second database comprising a plurality of PDF templates, each PDF template of the plurality of PDF templates corresponding to a tax form;
a processor operably connected to the first database and the second database, the processor configured to perform a method for generating a filable PDF tax form in a payroll processor system, the method comprising the steps of:
retrieving, by the processor, one PDF template of the plurality of PDF templates from the second database, each PDF template of the plurality of PDF templates corresponding to a tax form;
retrieving, by the processor, data selected from the at least one data pertaining to the employer from the first database;
creating, by the processor, a PDF file from the one PDF template, said PDF file comprising (i) multiple fields with a same field name explicitly appearing in each field of the multiple fields as a parameter of a function and (ii) formulas collectively having field references to the same field name explicitly appearing in different fields of the multiple fields;
renaming, by the processor, each different field of the multiple fields with a respective unique field name in accordance with a relative page position within the PDF file, of each different field of the multiple fields, wherein each respective unique field name of each different field of the multiple fields comprises: (i) said each different field's same field name explicitly appearing in each respective different field prior to said renaming and (ii) the relative page position of said each different field of the multiple fields, and wherein the relative page position of said each different field of the multiple fields is an integer;
regenerating, by the processor, the formulas collectively having field references to the same field name in the different fields of the multiple fields, said regenerating the formulas comprising: (i) for each field reference to the same field name in the formulas, replacing the function with an instance of the function, and (ii) replacing each field reference to the same field name in the different fields of the multiple fields by the unique field name specific to each different field;
after said renaming and said regenerating, producing, by the processor, the filable PDF tax form, said producing the filable PDF tax form comprising populating the PDF file with the retrieved data pertaining to the employer, said populating comprising using the regenerated formulas.

2. The system of claim 1, wherein the at least one data pertaining to the employer comprises at least one wage data applicable to the employer.

3. The system of claim 1, wherein the filable tax form contains a plurality of fields with at least one field of the plurality of fields determined by calculation using at least one other field of the plurality of fields, and wherein the method further comprises:
calculating, by at least the processor, the at least one field of the plurality of fields determined by calculation, wherein the step of producing the filable PDF tax form further comprises placing the calculated field onto the filable PDF tax form.

4. The system of claim 1, the method further comprising the steps, prior to the step of producing a filable PDF tax form, of:
receiving, by the processor, an entry of tax period data; and
determining, by the processor, at least one PDF template of the plurality of PDF templates to be used by the processor to produce the filable PDF tax form based on the entered tax period data.

5. The system of claim 1, wherein the first database further comprises at least one tax jurisdiction identified, the method further comprising the steps, prior to the step of producing the filable PDF tax form, of:
determining, by the processor, at least one PDF template of the plurality of PDF templates to be used by the processor to produce the filable PDF tax form based on the identified at least one tax jurisdiction.

6. The system of claim 5, wherein the at least one tax jurisdiction identifier comprises at least one state identifier.

7. The system of claim 1, further comprising:
a printer operably connected to the processor, wherein the processor is configured to send the filable PDF tax form to the printer.

8. The system of claim 1, further comprising:
a printer operable connected to a user system operably connected to the processor, wherein the user system is configured to send the filable PDF tax form to the printer.

9. The system of claim 1, further comprising:
a display device operably connected to the processor, wherein the processor is operable to display the filable PDF tax form produced by the processor.

10. The system of claim 1, wherein a user system comprises a display device, and wherein the user system is operable to display the filable PDF tax form produced by the processor.

11. The system of claim 1, further comprising:
a third database of business rules relating to each PDF template of the plurality of PDF templates, the business rules specifying information required for filing, completeness, and/or accuracy of the PDF template, wherein the processor is operable to compare the filable PDF tax form to the corresponding business rules.

12. The system of claim 1, further comprising:
a display device operably connected to the processor, the display device operable to display the filable PDF tax form produced by the processor;
a third database of business rules relating to each PDF template of the plurality of PDF templates, the business rules specifying information required for filing, completeness, and accuracy of the PDF template, wherein the processor is operable to compare the filable PDF tax form to the corresponding business rules, and, if the processor determines by the comparison of the business rules to the filable PDF tax form that the filable PDF tax form is inappropriate, incomplete, or inaccurate, the processor displays a message on the display device.

13. The system of claim 12, wherein a user system operably connected to the processor comprises the display device.

14. The system of claim 1, further comprising:
a plurality of programs with at least one program of the plurality of programs is associated with each PDF template of the plurality of PDF templates, each program of the plurality of programs accessible to the processor, wherein the processor executes one program of the at least one program for inclusion of a subset of the at least one data pertaining to the employer in the filable PDF tax form.

15. The system of claim 14, wherein the at least one data pertaining to the employer comprises at least one wage data applicable to the employer, wherein the processor is capable of populating the filable PDF tax form with a subset of the at least one wage data, and wherein a population of the subset of the at least one wage data in the filable PDF tax form is achieved by execution of a first program of the at least one program.

16. The system of claim 1, further comprising:
a plurality of programs, wherein each PDF template of the plurality of PDF templates comprises at least one program of the plurality of programs, and wherein a user system operably connected to the processor executes one program of the plurality of programs for inclusion of a subset of the at least one data pertaining to the employer in the filable PDF tax form.

17. The system of claim 16, wherein the at least one data pertaining to the employer comprises at least one wage data applicable to the employer, wherein a user system operably connected to the processor is capable of populating the filable PDF tax form with a subset of the at least one wage data, and wherein a population of the subset of the at least one wage data in the filable PDF tax form is achieved by execution of a first program of the at least one program.

18. The system of claim 1, further comprising:
a program associated with the at least one PDF template of the plurality of PDF templates corresponding to the PDF filable tax form having a plurality of fields, wherein the program is accessible to the processor, and wherein the program is executed by the processor for calculation of at least one field of the plurality of fields determined by calculation.

19. The system of claim 18, wherein the program comprises C++ source code.

20. The system of claim 18, wherein the program comprises JavaScript source code.

21. A method for generating a filable PDF tax form in a payroll processor system, the method comprising the steps of:
retrieving, by a processor operably connected to both a first database comprising at least one data pertaining to an employer and a second database comprising a plurality of PDF templates, one PDF template of the plurality of PDF templates from the second database, each PDF template of the plurality of PDF templates corresponding to a tax form;
retrieving, by the processor, data selected from the at least one data pertaining to the employer from the first database;

creating, by the processor, a PDF file from the one PDF template, said PDF file comprising (i) multiple fields with a same field name explicitly appearing in each field of the multiple fields as a parameter of a function and (ii) formulas collectively having field references to the same field name explicitly appearing in different fields of the multiple fields;

renaming, by the processor, each different field of the multiple fields with a respective unique field name in accordance with a relative page position within the PDF file, of each different field of the multiple fields, wherein each respective unique field name of each different field of the multiple fields comprises: (i) said each different field's same field name explicitly appearing in each respective different field prior to said renaming and (ii) the relative page position of said each different field of the multiple fields, and wherein the relative page position of said each different field of the multiple fields is an integer;

regenerating, by the processor, the formulas collectively having field references to the same field name in the different fields of the multiple fields, said regenerating the formulas comprising: (i) for each field reference to the same field name in the formulas, replacing the function with an instance of the function, and (ii) replacing each field reference to the same field name in the different fields of the multiple fields by the unique field name specific to each different field;

after said renaming and said regenerating, producing, by the processor, the filable PDF tax form, said producing the filable PDF tax form comprising populating the PDF file with the retrieved data pertaining to the employer, said populating comprising using the regenerated formulas.

22. The method of claim 21, wherein the at least one data pertaining to the employer comprises at least one wage data applicable to the employer.

23. The method of claim 21, wherein the filable PDF tax form contains a plurality of fields with at least one field of the plurality of fields determined by calculation using either a number or at least one other field of the plurality of fields, the method further comprising the step, prior to producing the filable PDF tax form, of:

calculating, by at least the processor, the at least one field of the plurality of fields determined by calculation, wherein the step of producing the filable PDF tax form further comprises placing the calculated field onto the filable PDF tax form.

24. The method of claim 23, wherein said calculating the at least one field is performed by the processor, a user system operably connected to the processor, or a combination thereof.

25. The method of claim 21, further comprising the steps, prior to the step of producing a filable PDF tax form, of:

receiving, by the processor, an entry of tax period data; and determining, by the processor, at least one PDF template of the plurality of PDF templates to be used by the processor to produce the filable PDF tax form based on the entered tax period data.

26. The method of claim 21, wherein the first database further comprises at least one tax jurisdiction identified, the method further comprising the steps, prior to the step of producing the filable PDF tax form, of:

determining, by the processor, at least one PDF template of the plurality of PDF templates to be used by the processor to product the filable PDF tax form based on the identified at least one tax jurisdiction.

27. The method of claim 21, further comprising the step of:

providing at least one program for the retrieved PDF template, wherein the step of producing the filable PDF tax form comprises executing, by the processor, the at least one program.

28. The method of claim 21, wherein the creating the PDF file comprises copying, from the one PDF template to the PDF file, the multiple fields and the formulas having field references to the same field name.

29. The method of claim 21, wherein the method further comprises:

prior to said renaming, inserting, by the processor, the function into the PDF file.

30. The method of claim 21, wherein the method further comprises:

inserting, by the processor into the PDF filable tax form, a watermark indicating that the PDF filable tax form has a status selected from the group consisting of incomplete, invalid, and a combination thereof.

31. The method of claim 21, wherein the PDF filable tax form is a compound document comprising a first field and a second field of the multiple fields, and wherein the method further comprises:

receiving, by the processor, one or more edits from a user system operably connected to the processor for a first field in the filable PDF tax form;

editing, by the processor, the first field in the filable PDF tax form based upon the one or more edits received from the user system; and updating, by the processor, a second field of the filable PDF tax form based on the edited first field.

32. The method of claim 31, wherein the PDF filable tax form is a compound document comprising a first field and the second field, wherein the edited first field comprises at least one value resulting from said editing, and wherein the updating the second field results in a value in the second field that is based on the at least one value in the edited first field.

33. The system of claim 1, wherein the creating the PDF file comprises copying, from the one PDF template to the PDF file, the multiple fields and the formulas having field references to the same field name.

34. The system of claim 1, wherein the method further comprises:

prior to said renaming, inserting, by the processor, the function into the PDF file.

35. The system of claim 1, wherein the method further comprises:

inserting, by the processor into the PDF filable tax form, a watermark indicating that the PDF filable tax form has a status selected from the group consisting of incomplete, invalid, and a combination thereof.

36. The system of claim 1, wherein the PDF filable tax form is a compound document comprising a first field and a second field of the multiple fields, and wherein the method further comprises:

receiving, by the processor, one or more edits from a user system operably connected to the processor for a first field in the filable PDF tax form;

editing, by the processor, the first field in the filable PDF tax form based upon the one or more edits received from the user system; and updating, by the processor, a second field of the filable PDF tax form based on the edited first field.

37. The system of claim 36, wherein the PDF filable tax form is a compound document comprising a first field and the second field, wherein the edited first field comprises at least one value resulting from said editing, and wherein the updating the second field results in a value in the second field that is based on the at least one value in the edited first field.

\* \* \* \* \*